US010853818B2

(12) United States Patent
Hodo

(10) Patent No.: US 10,853,818 B2
(45) Date of Patent: Dec. 1, 2020

(54) SECURING PRIVATE USER INFORMATION IN MULTI-PARTY-HOSTED COMPUTING DEVICE TRANSACTIONS

(71) Applicant: Red Maple Press, Inc., Boerne, TX (US)

(72) Inventor: Patrick G. Hodo, Boerne, TX (US)

(73) Assignee: Red Maple Press, Inc., Boerne, TX (US)

(*) Notice: Subject to any disclaimer, the term of this patent is extended or adjusted under 35 U.S.C. 154(b) by 185 days.

(21) Appl. No.: 16/123,995

(22) Filed: Sep. 6, 2018

(65) Prior Publication Data
US 2019/0147453 A1 May 16, 2019

Related U.S. Application Data

(60) Provisional application No. 62/554,995, filed on Sep. 6, 2017, provisional application No. 62/570,651, filed
(Continued)

(51) Int. Cl.
*G06Q 20/40* (2012.01)
*G06Q 20/42* (2012.01)
(Continued)

(52) U.S. Cl.
CPC ........... *G06Q 20/425* (2013.01); *G06Q 20/08* (2013.01); *G06Q 20/204* (2013.01);
(Continued)

(58) Field of Classification Search
CPC .... G06Q 20/425; G06Q 20/08; G06Q 20/204; G06Q 20/3821; G06Q 20/40; G06Q 20/409
(Continued)

(56) References Cited

U.S. PATENT DOCUMENTS 6,070,154 A 5/2000 Tavor et al.
8,494,959 B2 7/2013 Hathaway et al.
(Continued)

OTHER PUBLICATIONS

International Search Report and Written Opinion dated Dec. 27, 2018, from International Patent Application No. PCT/US2018/049791, 9 pp.

*Primary Examiner* — James D Nigh
(74) *Attorney, Agent, or Firm* — Klarquist Sparkman, LLP

(57) ABSTRACT

Disclosed herein are representative embodiments of methods, apparatus, and systems for maintaining the security of certain sensitive user information during computer network transactions between the user and multiple third-party hosts. Some example embodiments disclosed herein comprise a computer-implemented method, comprising, at a server separate from a merchant server and separate from a payment processor server: receiving data indicative of a transaction initiated by a customer from the merchant server; generating a unique identification value for the transaction; transmitting, to a customer's computing device, identifying information for a Uniform Resource Locator (URL) that is unique to the transaction; receiving a request to view a web page at the URL that is unique to the transaction; and generating data for a hosted-pay web page unique to the transaction, the hosted-pay web page including an embedded portion that facilitates payment directly with a payment processor server and not with a merchant server.

19 Claims, 45 Drawing Sheets

Related U.S. Application Data on Oct. 10, 2017, provisional application No. 62/617,099, filed on Jan. 12, 2018.

(51) Int. Cl.
*G06Q 20/38* (2012.01)
*G06Q 20/08* (2012.01)
*G06Q 20/20* (2012.01)

(52) U.S. Cl.
CPC ......... *G06Q 20/3821* (2013.01); *G06Q 20/40* (2013.01); *G06Q 20/409* (2013.01)

(58) Field of Classification Search
USPC .......................................................... 705/76
See application file for complete search history.

(56) References Cited

U.S. PATENT DOCUMENTS

| | | | |
|---|---|---|---|
| 10,445,731 B1* | 10/2019 | Dodds-Brown | G06Q 20/12 |
| 2004/0098313 A1 | 5/2004 | Agrawal et al. | |
| 2005/0262026 A1* | 11/2005 | Watkins | G06Q 20/3674 705/67 |
| 2015/0206139 A1* | 7/2015 | Lea | G06Q 20/02 705/44 |
| 2017/0004496 A1* | 1/2017 | Pujari | G06Q 20/3821 |
| 2017/0011395 A1* | 1/2017 | Pillai | G06Q 20/3278 |
| 2017/0024716 A1* | 1/2017 | Jiam | G06Q 30/02 |
| 2019/0026729 A1* | 1/2019 | Kalgi | G06Q 20/363 |

* cited by examiner

SECURING PRIVATE USER INFORMATION IN MULTI-PARTY-HOSTED COMPUTING DEVICE TRANSACTIONS

CROSS-REFERENCE TO RELATED APPLICATIONS

This application claims the benefit of U.S. Provisional Application No. 62/554,995 filed on Sep. 6, 2017, and entitled "SECURING PRIVATE USER INFORMATION IN MULTI-PARTY-HOSTED COMPUTING DEVICE TRANSACTIONS"; U.S. Provisional Application No. 62/570,651 filed on Oct. 10, 2017, and entitled "SECURING PRIVATE USER INFORMATION IN MULTI-PARTY-HOSTED COMPUTING DEVICE TRANSACTIONS"; and U.S. Provisional Application No. 62/617,099 filed on Jan. 12, 2018, and entitled "SECURING PRIVATE USER INFORMATION IN MULTI-PARTY-HOSTED COMPUTING DEVICE TRANSACTIONS", all of which are hereby incorporated herein by reference.

FIELD

This application relates to innovations in maintaining the security of certain sensitive user information during computer network transactions between a user and multiple third-party hosts.

SUMMARY

Disclosed below are representative embodiments of methods, apparatus, and systems for maintaining the security of certain sensitive user information during computer network transactions between the user and multiple third-party hosts. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another.

Some example embodiments disclosed herein comprise a computer-implemented method, comprising, at a server separate from a merchant server and separate from a payment processor server: receiving data indicative of a transaction initiated by a customer from the merchant server; generating a unique identification value for the transaction; transmitting, to a customer's computing device, identifying information for a Uniform Resource Locator (URL) that is unique to the transaction; receiving a request to view a web page at the URL that is unique to the transaction; and generating data for a hosted-pay web page unique to the transaction, the hosted-pay web page including an embedded portion that facilitates payment directly with a payment processor server and not with a merchant server. In certain implementations, the hosted-pay web page further includes one or more visual look-and-feel elements corresponding to the merchant server, thereby creating a hosted-pay web page that appears to be provided by the merchant server but is instead provided by the server that is separate from the merchant server and separate from the payment processor server. In some implementations, the data indicative of the transaction comprises an originating ID that identifies an identity of the merchant operating the merchant server. In such implementations, the method may further comprise, upon receiving the request to view the web page at the URL that is unique to the transaction: identifying the originating ID associated with the transaction; and retrieving data for performing the hosted pay web page for the merchant operating the merchant server, including data identifying a payment processor used by the merchant. In some implementations, the method further comprises: generating a transaction ID value for the transaction; and generating a reference ID values for the transaction. In such implementations, the method can further comprise embedding the reference ID value for the transaction into the URL that is unique to the transaction. In certain implementations, the method further comprises receiving a digital token from the payment processor server, the digital token being unique to the transaction; and transmitting to the merchant server data indicating that the transaction is authorized and ready to be completed. In some implementations, the method further comprises transmitting the digital token to the merchant server.

Other example embodiments comprise a computer-implemented method, comprising, at a server separate from a merchant server and separate from a payment processor server: receiving, from the merchant server and for a transaction with a merchant operating the merchant server, a first portion of a customer's credit card number, the first portion including one or more numbers of the customer's credit card number but not all of the numbers of the customer's credit card number; transmitting data to a computing device operated by the customer for rendering a web page that requests a second portion of the customer's credit card number, the second portion corresponding to the remaining one or more numbers of the customer's credit card number not specified by the first portion; and receiving, from the computing device operated by the customer, the second portion of the customer's credit card number. In some implementations, the method comprises transmitting, to a payment processor server, a complete version of the customer's credit card number assembled from at least the first portion and the second portion. In such implementations, the method can further comprise receiving, from the payment processor server, a digital token from the payment processor server, the digital token being unique to the transaction. Still further, the method can comprise transmitting to the merchant server data indicating that the transaction is authorized and ready to be completed. In some implementations, the first portion of the customer's credit card number is input by a representative, and the representative is never exposed to the complete customer's credit card number.

Other example embodiments comprise a computer-implemented method comprising, at a merchant server separate from a payment processor server: inputting, from a customer, a first portion of a customer's credit card number, the first portion including one or more numbers of the customer's credit card number but not all of the numbers of the customer's credit card number; and transmitting the first portion to a third-party server separate from the merchant server and the payment processor server. In some implementations, the method comprises transmitting a Uniform Resource Locator (URL) to a computing device operated by the customer for accessing a web page that requests a second portion of the customer's credit card number, the second portion corresponding to the remaining one or more numbers of the customer's credit card number not specified by the first portion. In such implementations, the web page is configured to transmit the second portion of the customer's credit card to the third-party server but not to any of the merchant server or the payment processor server.

Further embodiments concern a system, comprising: a physical and tangible object demarcated with a plurality of locations for a consumer to insert: (a) a first portion for a customer's credit card number, the first portion including one or more numbers of the customer's credit card number but not all of the numbers of the customer's credit card number; (b) contact information for the customer; and (c) order information, the order information comprising an indication of an item to be purchased; and one or more computer-readable media storing instructions, which when executed by a computer processor, cause the computer processor to perform a method, the method comprising displaying a representation of the customer's credit card number with the first portion of the customer's credit card number not visible. In some implementations, the one or more computer-readable media storing instructions include instructions configured to request the input of a second portion of the customer's credit card number that consist of the remainder of the customer's credit card number. In some implementations, the representation of the customer's credit card number masks the first portion of the customer's credit card number but allows input of a remaining portion of the customer's credit card number.

Some example embodiments disclosed herein comprise a computer-implemented method, comprising, at a server separate from a merchant system/server and separate from a payment processor server: receiving data indicative of a transaction to be closed for a customer from the merchant server; generating a unique identification value for the transaction; transmitting, to the merchant system/server, identifying information for a Uniform Resource Locator (URL) that is unique to the transaction; receiving a request to view a web page at the URL that is unique to the transaction; and generating data for a hosted-pay web page unique to the transaction, the hosted-pay web page including an embedded portion that facilitates payment directly with a payment processor server and not with the merchant system/server.

The disclosed innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

BRIEF DESCRIPTION OF THE DRAWINGS

FIGS. 22-35 show further example screen shots for embodiments of the disclosed secure payment process.

DETAILED DESCRIPTION

I. General Considerations

Figure 1:
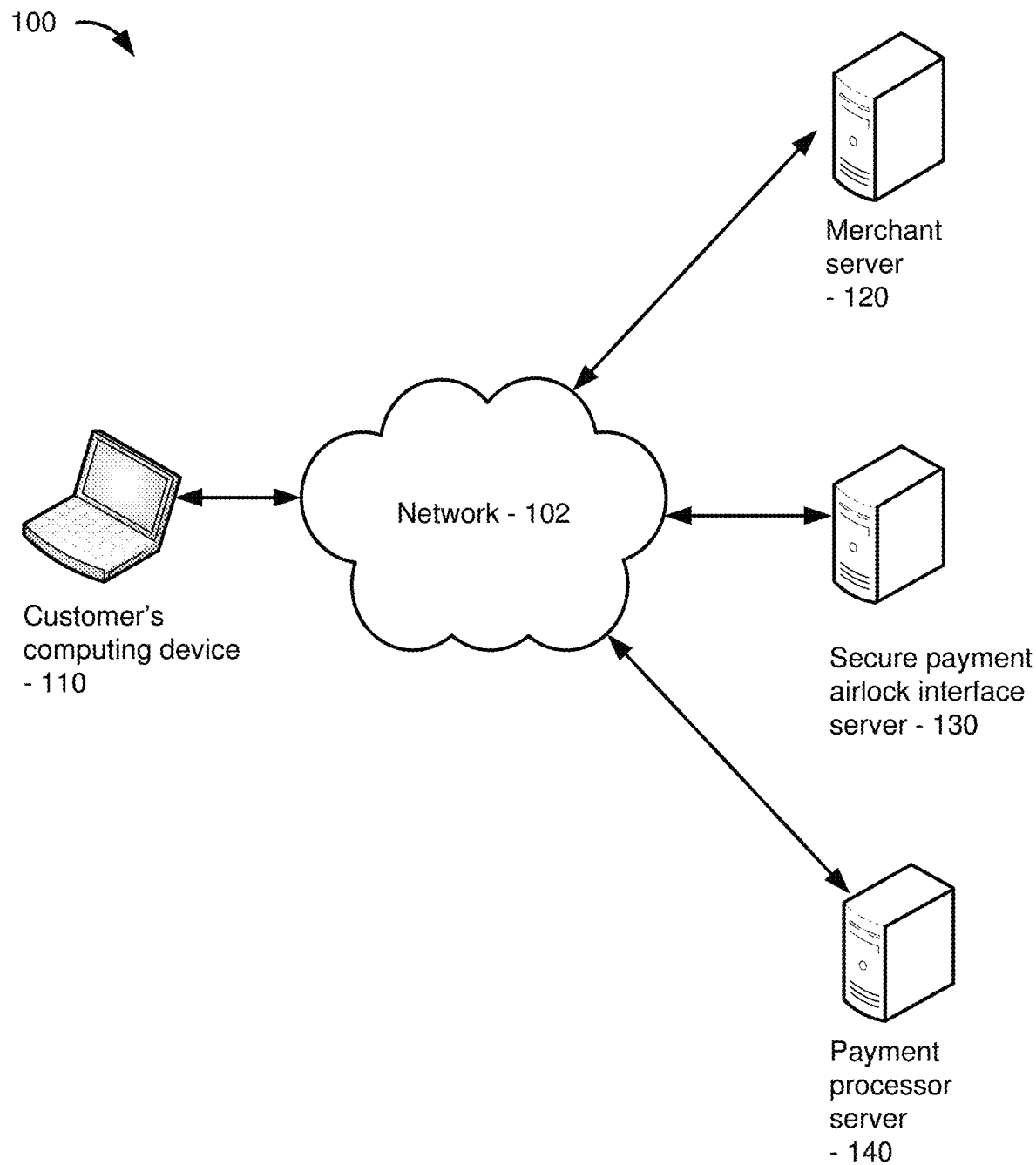
FIG. 1 is a schematic block diagram illustrating an example network configuration in which embodiments of the disclosed technology can be implemented.

Disclosed below are representative embodiments of methods, apparatus, and systems for maintaining the security of certain sensitive user information during computer network transactions between the user and multiple third-party hosts. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

Implementations of the disclosed technology provide numerous technical and internet-centric advantages. For example, embodiments of the disclosed technology reduce the computational burden, power burden, and/or memory burden of the various actors in an electronic transaction by using a distributed system in which various portions of the transaction are distributed and handled by different and distinct servers. Further, embodiments of the disclosed technology involve internet-centric technologies that include, for example, the rendering of websites to maintain the "look and feel" of a merchant's web page but that also include an embedded secure portion (not maintained or controlled by the merchant, but instead maintained and controlled by a payment processor) that is used to complete a transaction. Such hosted pay web pages are composite web pages that include an interface to complete the transaction with a payment processor but that retain the merchant website's "look and feel". This hybrid web page uniquely provides a mechanism to securely provide the payment processor with the necessary information to complete the transaction without having the merchant itself receive a complete credit card number (e.g., thus aiding in compliance with the PCI DSS). Still further, embodiments of the disclosed technology improve the security of certain transactions by ensuring that a merchant never receives an entire credit card number of a customer, thus creating a system that not only is secure against cybersecurity attacks (or a nefarious employee of the merchant) but also is compliant with the Payment Card Industry Data Security Standard ("PCI DSS"), thereby eliminating the need for PCI audits that can be costly and disruptive.

II. Example Computing Environments

FIG. 1 is a schematic block diagram illustrating an example network configuration 100 in which embodiments of the disclosed technology can be implemented. The network configuration includes a customer's computing device 110 (e.g., a mobile device, laptop, tablet, PC, operating any of a variety of operating systems or platforms, such as Windows, Unix, IOS, Android), a merchant server 120 (e.g., a computing system or server that is accessed by a merchant representative, such as a customer service representative, as part of a transaction with the customer), a "secure payment airlock interface" server 130 (e.g., a computing system or server operated by a party/entity different than the merchant, the customer, the credit card provider, and the payment processor), and a payment processor server 140 (e.g., a computing system or server operated by a party/entity different than the merchant, the customer, the credit card provider, and the secure payment airlock interface provider).

In operation, the computing devices illustrated in FIG. 1 are in communication via a network 102. Such communication can be performed, for example, via the internet (e.g., using the HTTP protocol) or other network connection.

Figure 2:
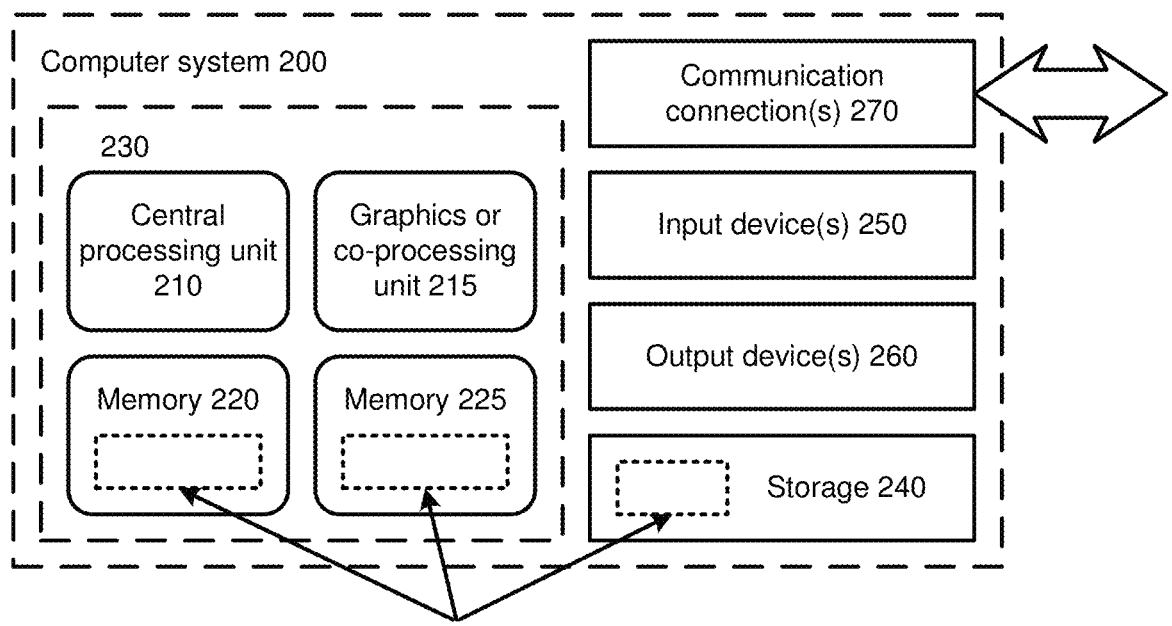
FIG. 2 illustrates a generalized example of a suitable computer system in which the described innovations may be implemented.

FIG. 2 illustrates a generalized example of a suitable computer system 200 in which the described innovations may be implemented. The example computer system 200 can implement, for example, any of the devices or servers shown in FIG. 1 and/or any of the disclosed features, aspects, and/or functions of the disclosed technology. With reference to FIG. 2, the computer system 200 includes one or more processing devices 210, 215 and memory 220, 225. The processing devices 210, 215 execute computer-executable instructions. A processing device can be a general-purpose CPU, GPU, processor in an ASIC, FPGA, or any other type of processor. In a multi-processing system, multiple processing units execute computer-executable instructions to increase processing power. For example, FIG. 2 shows a CPU 210 as well as a GPU or co-processing unit 215. The tangible memory 220, 225) may be volatile memory (e.g., registers, cache, RAM), non-volatile memory (e.g., ROM, EEPROM, flash memory, NVRAM, etc.), or some combination of the two, accessible by the processing device(s). The memory 220, 225 stores software 280 implementing one or more innovations described herein, in the form of computer-executable instructions suitable for execution by the processing device(s).

A computer system may have additional features. For example, the computer system 200 includes storage 240, one or more input devices 250, one or more output devices 260, and one or more communication connections 270. An interconnection mechanism (not shown) such as a bus, controller, or network interconnects the components of the computer system 200. Typically, operating system software (not shown) provides an operating environment for other software executing in the computer system 200, and coordinates activities of the components of the computer system 200.

The tangible storage 240 may be removable or non-removable, and includes magnetic disks, magnetic tapes or cassettes, optical storage media such as CD-ROMs or DVDs, or any other medium which can be used to store information and which can be accessed within the computer system 200. The storage 240 stores instructions for the software 280 implementing one or more innovations described herein.

The input device(s) 250 may be a touch input device such as a keyboard, mouse, game controller, pen, or trackball, a voice input device, a scanning device, or another device that provides input to the computer system 200. For video or image input, the input device(s) 250 may be a camera, video card, TV tuner card, screen capture module, or similar device that accepts video input in analog or digital form, or a CD-ROM or CD-RW that reads video input into the computer system 200. The output device(s) 260 include a display device. The output device(s) may also include a printer, speaker, CD-writer, or another device that provides output from the computer system 200.

The communication connection(s) 270 enable communication over a communication medium to another computing entity. For example, the communication connection(s) 270 can connect the computer system 200 to the internet and communicate with a remote server providing support/hosting services according to the functionality described herein. The communication medium conveys information such as computer-executable instructions, audio or video input or output, image data, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system 200, computer-readable media include memory 220, 225, storage 240, and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

III. Example Embodiments

Figure 3:
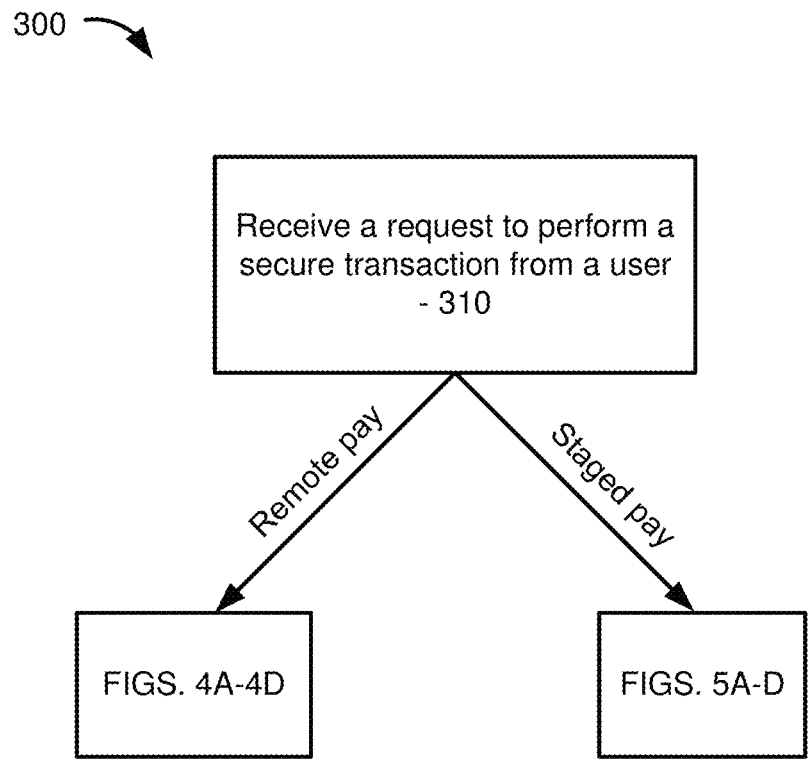
FIG. 3 is a flow chart illustrating an example embodiment for selecting one of multiple secure transaction mechanisms to complete a digital transaction in a secure manner.

FIG. 3 is a flow chart 300 illustrating an example embodiment for selecting one of multiple secure transaction mechanisms to complete a digital transaction in a secure manner in accordance with the disclosed technology. The example mechanisms can be used, for instance, to prevent a customer's complete credit card number from being received by a merchant. Such embodiments can thus allow the merchant to reduce or avoid PCI DSS audit or reporting requirements.

At 310, a request to perform a secure transaction is received by a user. In particular embodiments, the user can be an operator or customer service representative for a merchant who is corresponding with a customer on a phone call, video chat session, or real-time messaging session. In other embodiments, the user is in a retail environment as part of an in-person transaction with the customer. During the communication with the customer, the customer may request to place an order for a product or service offered by the merchant (or request to pay for an existing order) using a credit card. The operator or representative can ask the customer if they would like to use a remote secure checkout process on a computing device operated by the customer (referred to herein as "remote pay") or begin payment by relaying part of (a portion of) the customer's card over the phone with the remainder being conveyed through a later communication from the user's computing device (referred to herein as "staged pay"), both of which are example of secure transaction embodiments as disclosed herein.

The user (e.g., a customer service representative for the merchant) can initiate this process, for example, by invoking the secure payment method through a user interface on a program executing at a computing device operated by the user and supported by the merchant server 120. In block diagram 600 of FIG. 6, for example, the user interface includes a "remote pay" button 610 or a "staged pay" button 612 for starting the secure payment process. If the user selects the "remote pay" operation, then the process continues at FIGS. 4A-4D. If the user selects the "staged pay" operation, then the process continues at FIGS. 5A-5D.

FIGS. 4A-4D are schematic block diagrams 400-403 illustrating an example network configuration and series of communications between the network elements. The network configuration includes a customer's computing device 110 (e.g., a mobile device, laptop, tablet, or PC operating any of a variety of operating systems or platforms, such as Windows, Unix, IOS, or Android), a merchant server 120 (e.g., a computing system or server that is accessed by a merchant representative, such as a customer service representative, as part of a transaction with the customer), a secure payment airlock interface server 130 (e.g., a computing system or server operated by a party/entity different than the merchant, the customer, the credit card provider, and the payment processor; in particular embodiments, said server will only allow portions of a credit card to be entered into the interface securely; the entire number will only be permitted to be transmitted through a different interface (e.g., encrypted and sent to a payment processor)), and a payment processor server 140 (e.g., a server operated by a party/entity different than the merchant, the customer, the credit card provider, and the secure payment airlock interface provider).

More specifically, FIGS. 4A-4D show an example sequence of interactions that occur when a customer service representative for a merchant selects a first secure payment option (e.g., "remote pay", from FIG. 3). It should be understood, however, that the example of FIGS. 4A-4D can be performed independently of FIG. 3 (e.g., as a stand-alone process). The illustrated interactions are shown by way of example only, as any one or more of the interactions may be omitted in certain embodiments, performed in a different sequence, performed concurrently, or replaced by some other actions. Also, additional interactions may also be included that are not illustrated here.

At 410, a request for a customer delivery modality is received by the user (e.g., a representative of the merchant). The representative of the merchant may, for example, collect this information in a phone call or online chat session with the customer (e.g., as part of a phone call initiated by the customer). In particular embodiments, the request can include an identification of one from among a plurality of modalities. For example, the available delivery modalities can include "email" or "text" and be responsive to a communication from the customer.

Figure 7:
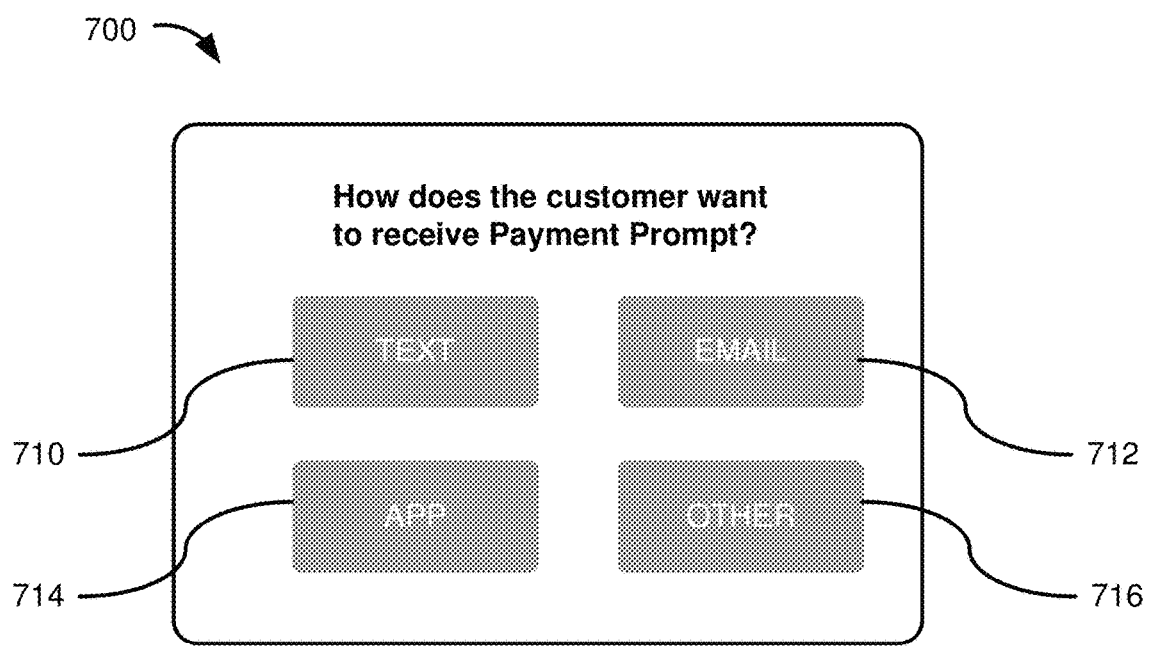
FIG. 7 is a block diagram showing an example user interface for selecting a customer delivery modality.

The user can initiate this process, for example, by invoking the secure payment method through a user interface on a program executing at the computing device operated by the user (e.g., a representative of the merchant) and supported by the merchant server 120. In FIG. 7, for example, the user interface includes a "text" button 710, "email" button 712, "app" button 714 (e.g., for sending the relevant information through an installed app on a mobile device operated by the customer), and "other" button 716, for selecting another delivery modality for completing the remainder of the transaction.

At 412, based on the selection, information is retrieved from the customer to facilitate the "remote payment" delivery modality. For example, the customer's email address can be input (e.g., when the customer requests that payment proceed through the "email" option, the customer's email address can be received through a communication from the customer) or the customer's phone number can be input (e.g., when the customer requests that payment proceed through the "text" option, the customer's phone number can be received through a communication with the customer). The retrieval can include the user inputting the information (e.g., during a phone call or other communication with the customer) or can include retrieval from a database that stores customer information for returning customers.

At 414, an originating identification value (e.g., a unique "originating ID") is generated and sent to a remote secure payment airlock interface server 130. The originating identification can correspond to a sales order, invoice, project, job, or other desired transaction. A merchant identification (e.g., a unique ID for the merchant requesting the transaction) can also be sent to the secure payment airlock interface server 130. In some embodiments, for example, the merchant identification can be embedded into the originating ID. For instance, a fixed set of number values in the originating ID can be dedicated to identifying the merchant. In general, the originating ID serves as a transaction tracker and establishes a record in the secure payment airlock interface server for the transaction.

At 416, the secure payment airlock interface server 130 receives the originating identification value and generates a transaction identification value ("transaction ID"). In some embodiments, this is performed by taking the originating identification value, combining it with a separate globally unique identifier ("GUID" or "UUID"), and encrypting both into an encrypted string (e.g., alphanumeric string) via a suitable encrypting technique (e.g., a suitable hashing algorithm, such as an MD5 or SHA algorithm). The resulting encrypted string is referred to herein as a reference identification (or "reference ID"). Further, in certain embodiments, the resulting reference ID is stored in a record associated with the originating ID.

At 418, the reference ID is transmitted to the customer. In particular embodiments, the reference ID is embedded in data transmitted to the customer. In particular embodiments, the reference ID can form part of an URL that is sent to the customer through the selected customer delivery modality (e.g., as a link embedded in an email or as a link embedded in a text message delivered to the customer's phone number). One example format for the URL is: http://www.remotepay.com/[referenceId], or http://www.stagedpay.com/[referenceId].

At 420, the customer receives the URL with the embedded reference ID via the selected customer delivery modality (e.g., as part of a text or email). In some embodiments, a time period is set in which the customer can perform the payment method embodied by the customer delivery modality. For instance, an expiration time or data can be set for the customer to finalize the payment through the transmitted modality.

Figure 4A:
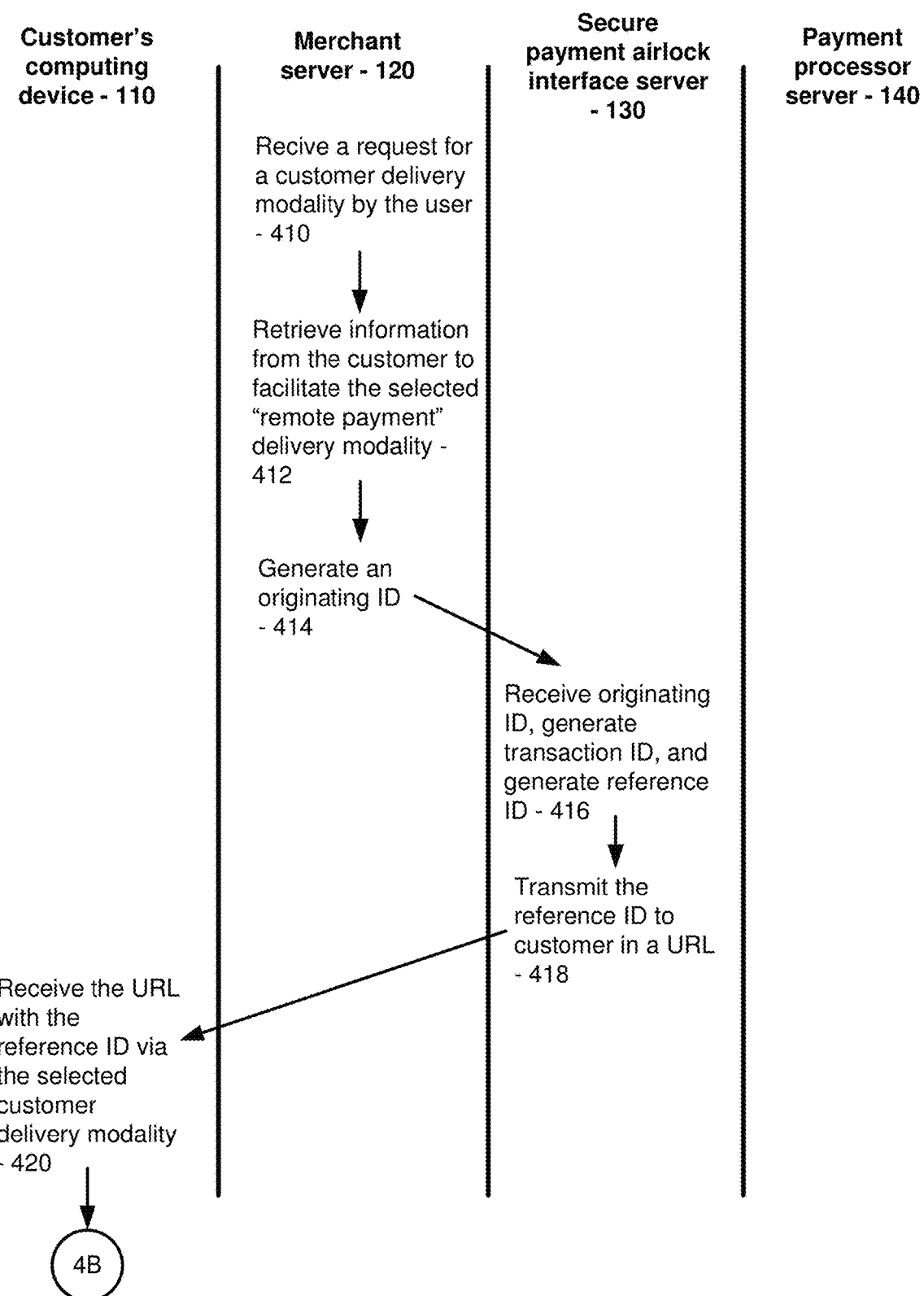
FIGS. 4A-4D are schematic block diagrams illustrating an example network configuration and series of communications between the network elements for completing a transaction among distributed devices in accordance with a first embodiment of the disclosed technology.
Figure 4B:
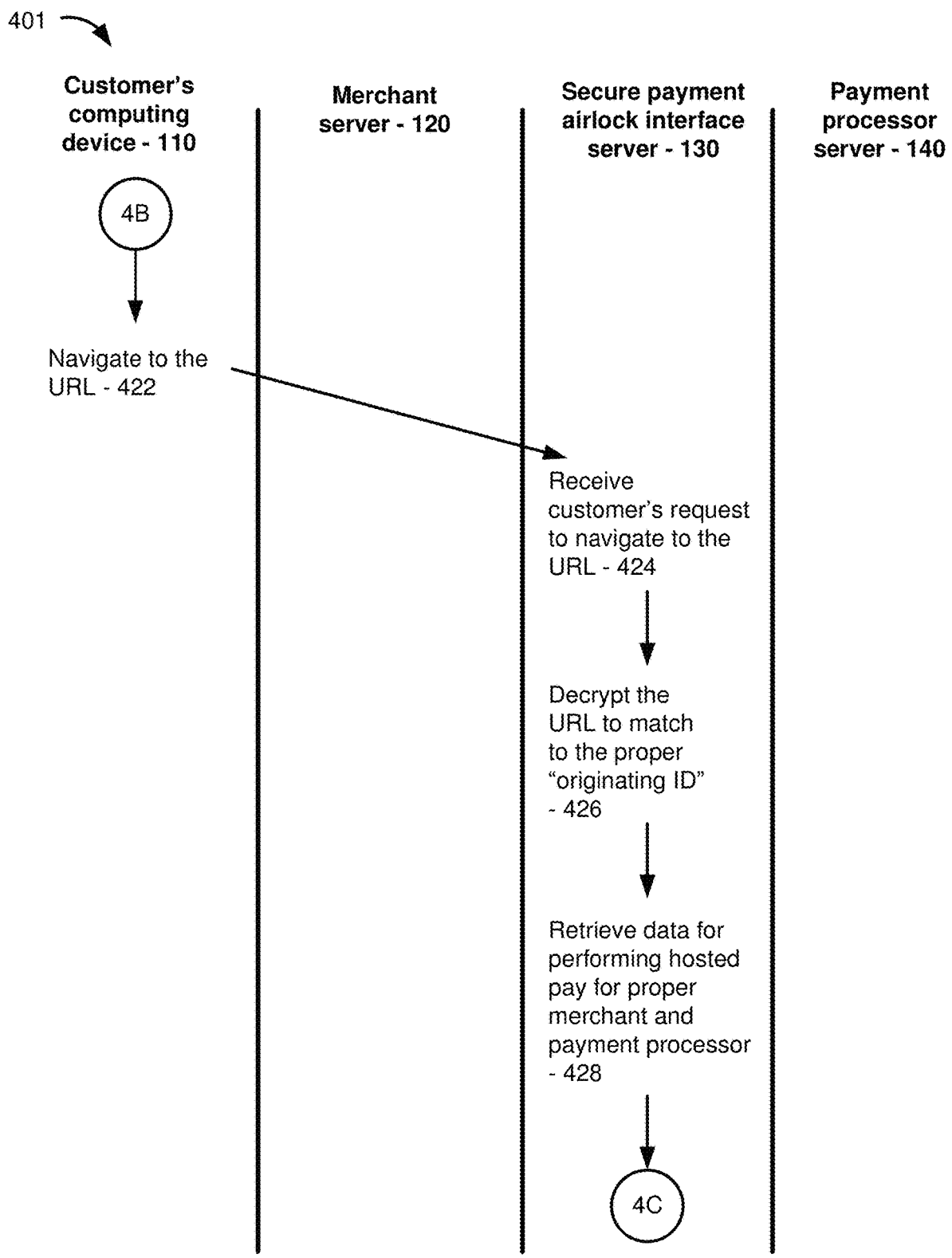
Figure 4C:
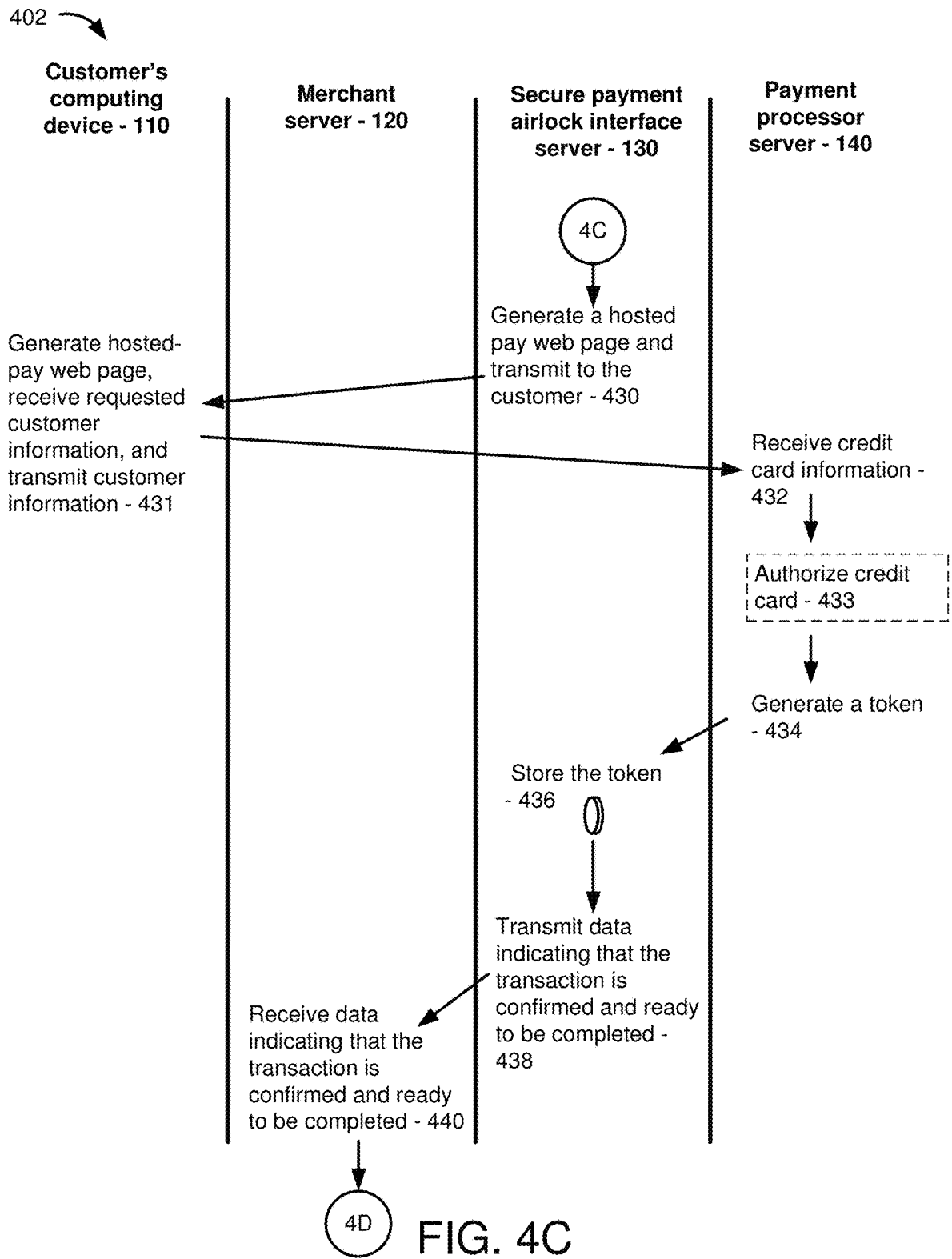

Referring to FIG. 4B, at 422, the customer navigates to the URL (e.g., using a web browser executing on the customer's device). For instance, the text or email sent by the customer can include an executable link that opens a browser and automatically navigates to the received URL. Notably, the customer can elect to navigate to the URL at any time (or until the URL expires, which can be set to any time period (1 hour, 2 hours, 12 hours, 24 hours, m minutes, n seconds, etc.)). This allows the payment process to be staged over multiple phases and further allows the customer to commence the payment process at a first time (e.g., as part of a phone call at a time when the customer cannot easily use other functionality of their device (such as while driving)) and can complete the payment process at a second time (e.g., when the customer can safely or otherwise has access to their device).

At 424, the secure payment airlock interface server 130 receives the customer's request to navigate to the URL (e.g., via a suitable HTML message).

At 426, the secure payment airlock interface server 130 decrypts the URL to match to the proper "originating ID". This decryption is performed using the "reference ID" embedded in the URL.

At 428, data is received for performing the remote payment process using the proper merchant and payment processor. For example, using an underlying database maintained by the secure payment provider (e.g., the entity/operator of the secure payment airlock interface server 130), the secure payment airlock interface server can recognize the underlying merchant (the proper merchant) and a selected payment processor used by the merchant. For instance, the underlying database can store record entries for each merchant that further include a record entry for identifying the payment processor (or payment processors) used by that merchant.

At 430, a hosted-pay web page is generated and transmitted to the customer. At 431, the hosted-pay web page is generated at the customer's computing device, the relevant customer information is received from the user (e.g., credit card number, expiration date, and/or CSV number), and the relevant customer information is transmitted to the payment processor server 140 through the secure exchange offered by the payment processor window of the hosted-pay web page.

The hosted-pay web page typically includes merchant-specific text and images to create a "look and feel" for the web page that matches the merchant's own website. The hosted pay web page also includes an embedded third-party payment processor portion that is integrated within the web page but allows for a secure exchange of information only with the payment processor server 140. Thus, while surrounding text and imagery is customized for the merchant, the payment information requested and received by the customer is only exchanged between the customer and payment processor—not the merchant.

Such hosted pay web pages thus allow the merchant to reduce or avoid PCI DSS audit or reporting requirements. For instance, the link that is used by the customer is directed to a web page (e.g., hosted by the secure payment airlock interface server or by the merchant's server) that contains an iFrame that includes the merchant's payment processor's hosted-pay window where the customer can securely enter the customer's credit card information into the web page.

In some embodiments, the hosted-pay website is hosted by the secure payment airlock interface server 130 as shown (but the hosted-pay window for the payment processor is hosted by the payment processor server 140). In other embodiments, the hosted-pay website is hosted by the merchant's server 120 (but the hosted-pay window for the payment processor is still hosted by the payment processor server 140). In the latter case, the secure payment airlock interface server 130 can redirect the customer to a URL hosted by the merchant's server with the proper information to continue processing the payment.

Figure 8:
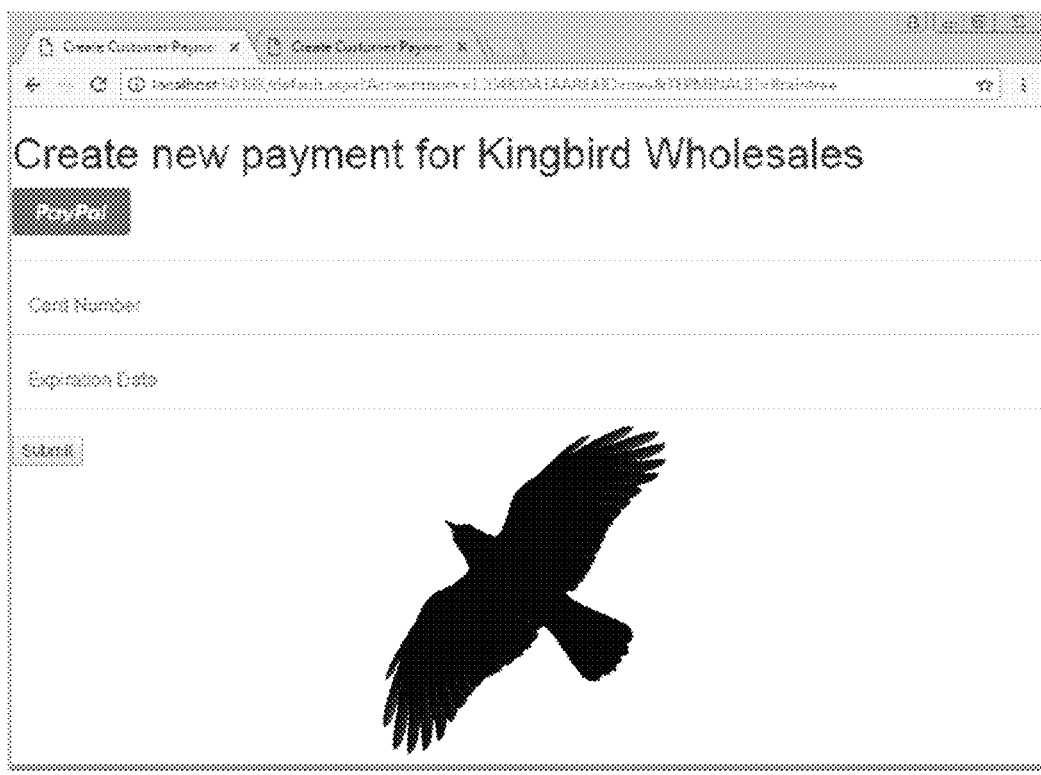
FIGS. 8-10 show example screen shots for a first secure payment process in accordance with an embodiment of the disclosed technology.
Figure 9:
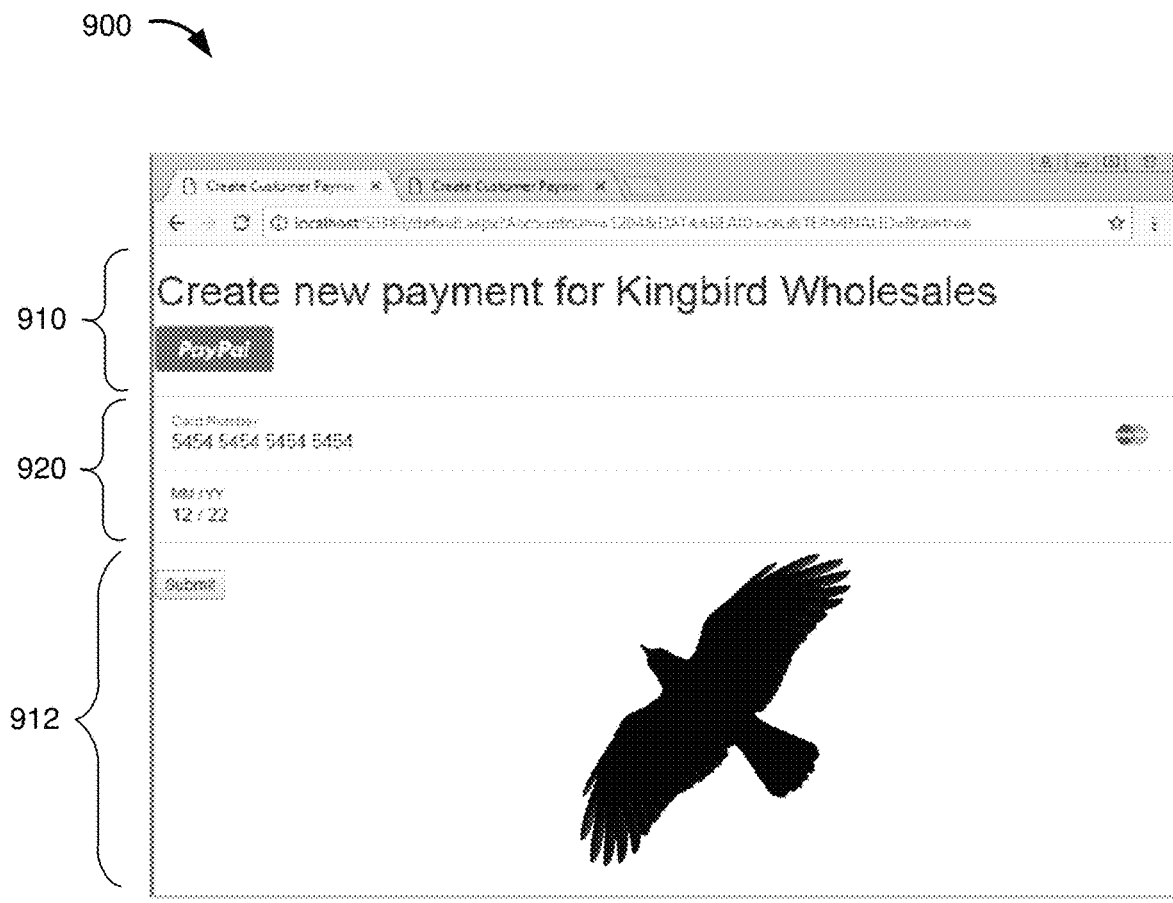

An example screen shot for the hosted-pay website generated at 430 is illustrated in example web page 800 of FIG. 8. The web page 800 can be displayed at the computing device 110 operated by the customer. As noted, the web page 800 includes one or more portions that are merchant-specific (such as portions 810 and 812) as well as a payment processor portion 820 embedded within the website to maintain the "look and feel" of the merchant's web experience. Via payment processor portion 820, the customer is requested to input payment data, including the customer's credit card number and expiration date.

A further screen shot for the hosted-pay web page is shown at 900. As noted, the web page includes one or more portions that are merchant-specific (shown as portions 910 and 912 in web page 900) as well as a payment processor portion 920 embedded within the web page to maintain the "look and feel" of the merchant's web experience. In 920, the customer's credit card information (including the number and expiration date (and optionally the CSV number)) has been inserted into the portion of the hosted-pay web page managed by the payment processor (and preventing the receipt of the information by the merchant).

Returning to FIG. 4, at 432, the credit-card information is received by the payment processor (e.g., the payment processor server 140).

Figure 10:
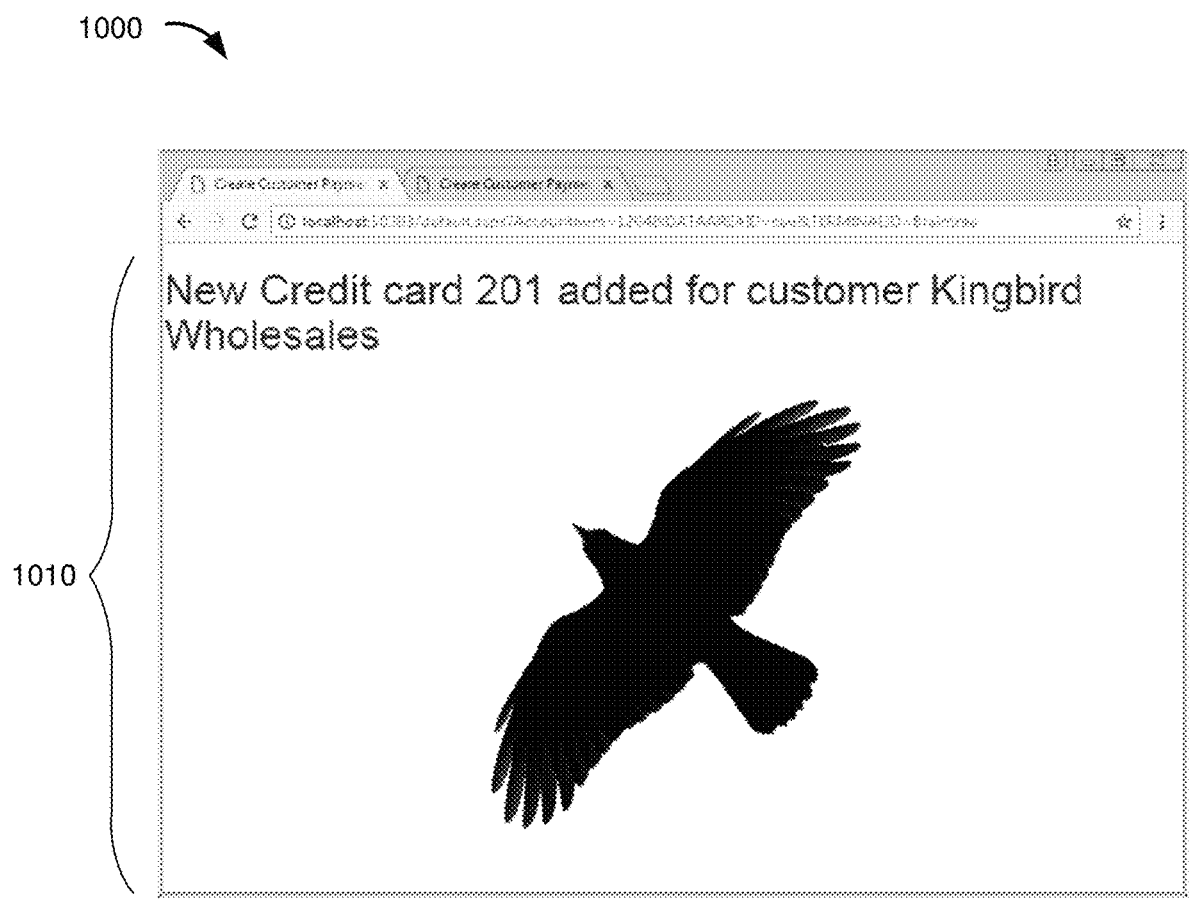

Once payment is submitted, a screen shot as in web page 1000 of FIG. 10 showing confirmation that the customer's credit card has been added to the customer's account can be transmitted to the customer. In screen portion 1010, no credit card information need be displayed, and thus can comprise merchant customized text and imagery.

At 433, the credit card information is optionally authorized (e.g., by the payment processor server 140) to confirm that the credit card exists and, in some cases, has an available balance or credit limit to permit the transaction to continue.

At 434, a token is generated (e.g., by the payment processor server 140). In particular embodiments, the token can represent an encryption of the credit card number and the reference ID. For instance, the token or "profile" can be a number or alpha numeric representation of the credit card number from the customer that is then provided by the payment processor to the merchant. This token or profile can be either one value or more (e.g., two), depending on the payment processor. In each case, the value is unique between the processor and the merchant and is only valid between the two.

At 436, the token is stored at the secure payment airlock interface server 130. At this point, the "lodging" of the credit card information is complete.

At 438, data indicating that the transaction is confirmed and ready to be completed is transmitted to the merchant server 120. In some embodiments, an email or message is sent to merchant server 120 that the transaction is ready. In particular embodiments, the data can include data sufficient to identify the transaction that has been authorized. For example, the "reference ID" and/or "originating ID" can be transmitted as part of the data. Further, this data can be encrypted. For example, the originating ID can be encrypted with communication encryption, such as TLS1.2 or any other state-of-the-art HTTPS encryption. Because the originating ID and reference ID are included in the return information, the originating system can use these fields to lookup the original record and place the token and transaction ID with the correct transaction that started the transaction.

At 440, the data indicating that the transaction is confirmed and ready to be completed is received by the merchant server 120. For example, the merchant server 120 can receive a notification (e.g., an email or message) through a merchant dashboard, merchant portal, or an enterprise resource planning (ERP) module that the card lodging has been completed. In some embodiments, if there was a problem, the user (or the user's server) can re-send a new link. If the card was lodged, the user can proceed with the order. If there was a problem, the user (or the user's server) can advise the customer.

Figure 4D:
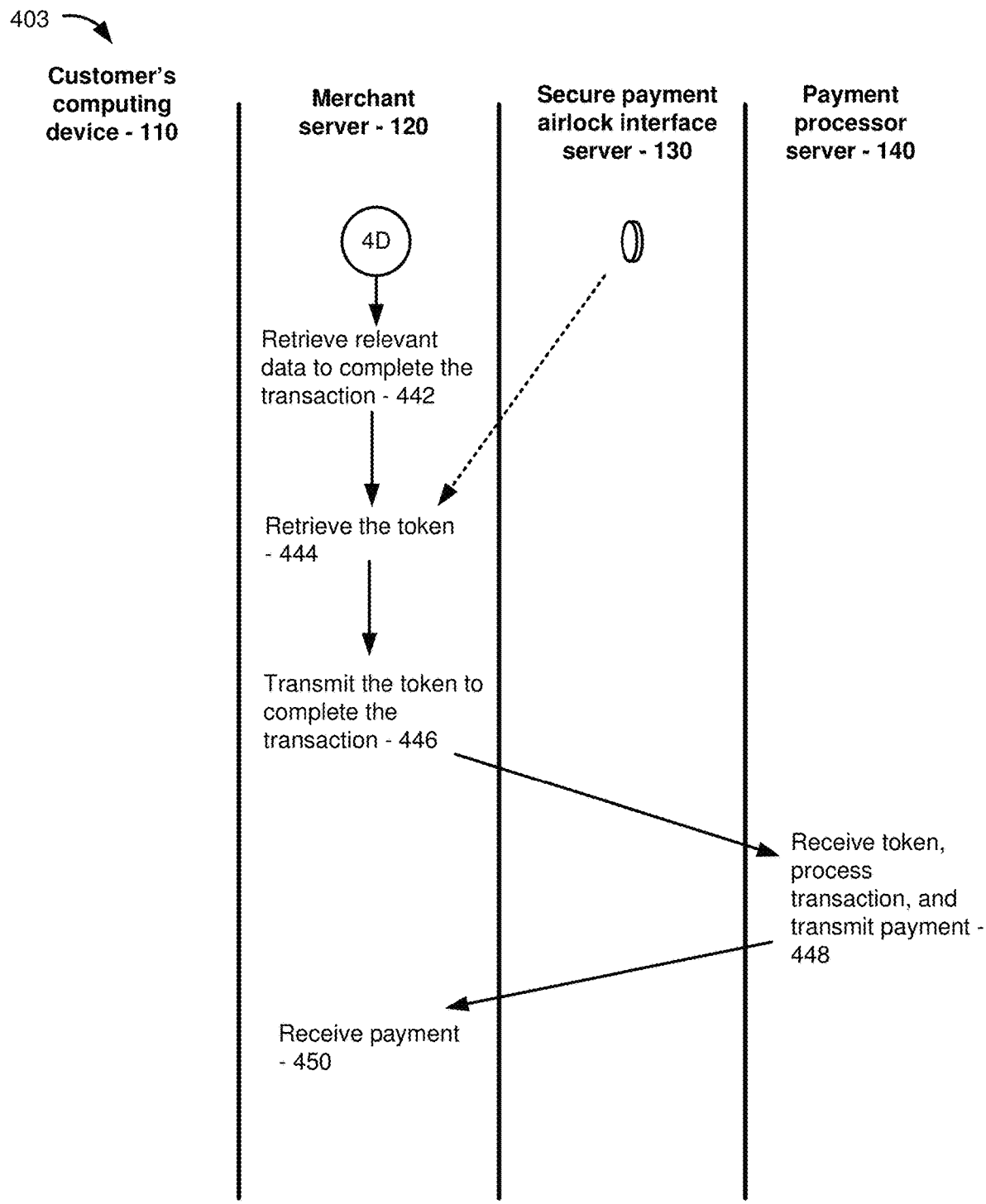

As shown in FIG. 4D, at 442, the merchant server 120 retrieves relevant data to complete the transaction. For example, the "reference ID" can be retrieved from the data received at 440. The reference ID may represent multiple transactions (e.g., multiple items or services to be purchased) in a single reference ID, or multiple reference IDs can be employed for such transactions.

At 444, the merchant retrieves the token (e.g., the token generated for the transaction) from the secure payment airlock interface server 130. This action can be performed by the merchant dashboard, merchant portal, or merchant ERP module executing at the merchant server 120.

At 446, the token is transmitted from the merchant server 120 to the payment processor server 140 to complete the transaction. In particular, the token and other relevant transaction information are sent to the payment processor server 140 (e.g., the total price for the transaction). As an example, consider a case where a customer wants to purchase an item (e.g., a shirt). When the merchant begins the transaction, the merchant can choose the process to lodge the card with any of the aforementioned options. When the token is received, the merchant will process and provide an authorization or sale transaction to the processor using the token (or profile) received instead of the actual credit card number along with an amount and other information. The processor will receive this number (e.g., at 448) in lieu of a credit card number and process the transaction as a valid transaction.

At 448, the payment processor server 140 uses the token to process the credit card payment and transmit the payment to the merchant server 120.

At 450, the payment is received at the merchant server 120, thereby completing the transaction. In some cases, other transactions may follow (e.g., to refund the customer's money, void transactions, or convert authorizations to captures).

Turning now to FIGS. 5A-D, FIGS. 5A-D are schematic block diagrams 500-503 illustrating an example network configuration and series of communications between the network elements for performing a so-called "staged pay" transaction. The network configuration includes a customer's computing device 110 (e.g., a mobile device, laptop, tablet, or PC operating any of a variety of operating systems or platforms, such as Windows, Unix, IOS, or Android), a merchant server 120 (e.g., a server that is accessed by a merchant representative, such as a customer service representative, as part of a transaction with the customer), a secure payment airlock interface server 130 (e.g., a server operated by a party/entity different than the merchant, the customer, the credit card provider, and the payment processor; in particular embodiments, said server will only allow portions of a credit card to be entered into the interface securely; the entire number will only be permitted to be transmitted through a different interface (e.g., encrypted and sent to a payment processor)), and a payment processor server 140 (e.g., a server operated by a party/entity different than the merchant, the customer, the credit card provider, and the secure payment processor).

More specifically, FIGS. 5A-5D show an example sequence of interactions that occur when a customer service representative for a merchant selects a second secure payment option (e.g., "staged pay"). It should be understood, however, that the example of FIGS. 4A-4D can be performed independently of FIG. 3 (e.g., as a stand-alone process). For example, FIGS. 22-35 are example screen shots where features of the technology shown in FIGS. 5A-5D are performed as part of an online retail experience initiated at a payment screen of a merchant. The illustrated interactions are shown by way of example only, as any one or more of the interactions may be omitted in certain embodiments, performed in a different sequence, performed concurrently, or replaced by some other actions. Also, additional interactions may also be included that are not illustrated here.

At 510, a portion of the customer's credit card number (but not the entirety of the number) is input. For example, the input can be received via a payment initiation screen displayed to the user (e.g. a customer service representative of the merchant). Further, the data input via the screen can be communicated via a phone call, video chat session, or real-time messaging session with a customer who desires to place an order or pay for an item/services.

Figure 11:
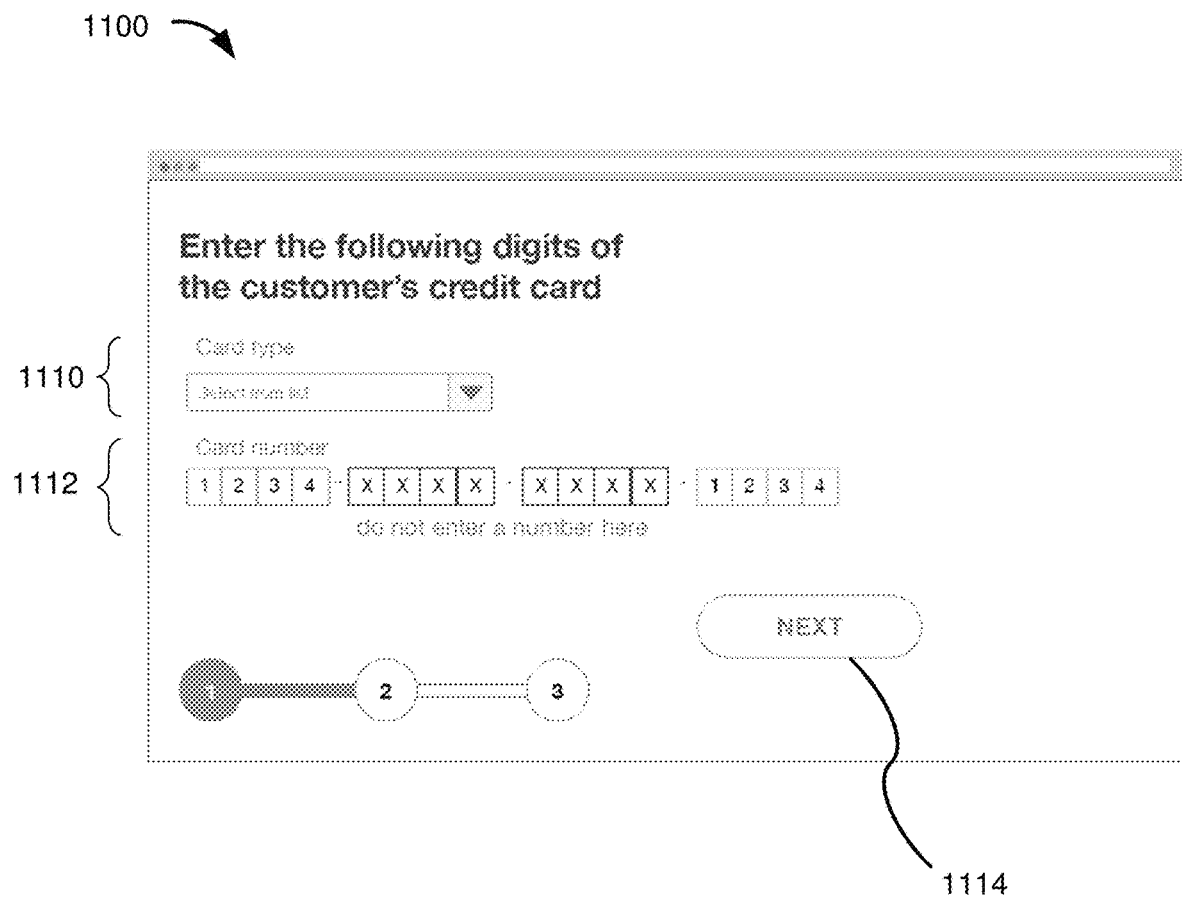
FIGS. 11-15 show example screen shots for a second secure payment process in accordance with an embodiment of the disclosed technology.

An example payment initiation web page 1100 is shown in FIG. 11 and includes a card type selection portion 1110 (here, a pull-down screen) and a card number input portion 1112. The card type selection portion 1110 can be omitted (e.g., in instances where the first four numbers of the card number are presented, as those number identify the card type). The card number input portion 1112 allows for the user to only input a portion of the customer's credit card number but not the full number. The portion of the credit card number allowed to be entered can be any portion or quantity of the credit card numbers, but in the illustrated embodiment comprises the first four digits and the last four digits. The user can receive the portion of credit card numbers from the customer during a phone call, video chat session, or real-time messaging session with the customer. Once the user inputs the specified number of digits, then the user can select a "next" button 1114.

Returning to FIG. 5A, at 511, this first portion of the credit card number is transmitted to and received by the secure payment airlock interface server 130. Notably, because the credit card number is only partial, it is considered PCI public information and secured. In some instances, other information is transmitted as well, such as the expiration date and/or CVS number. Along with this information may be the originating ID or the reference ID (as described above) to provide context to the transaction.

At 512, a delivery option for completion of the transaction is input. For example, the input can be received via a completion option web page hosted by the merchant server 120.

Figure 12:
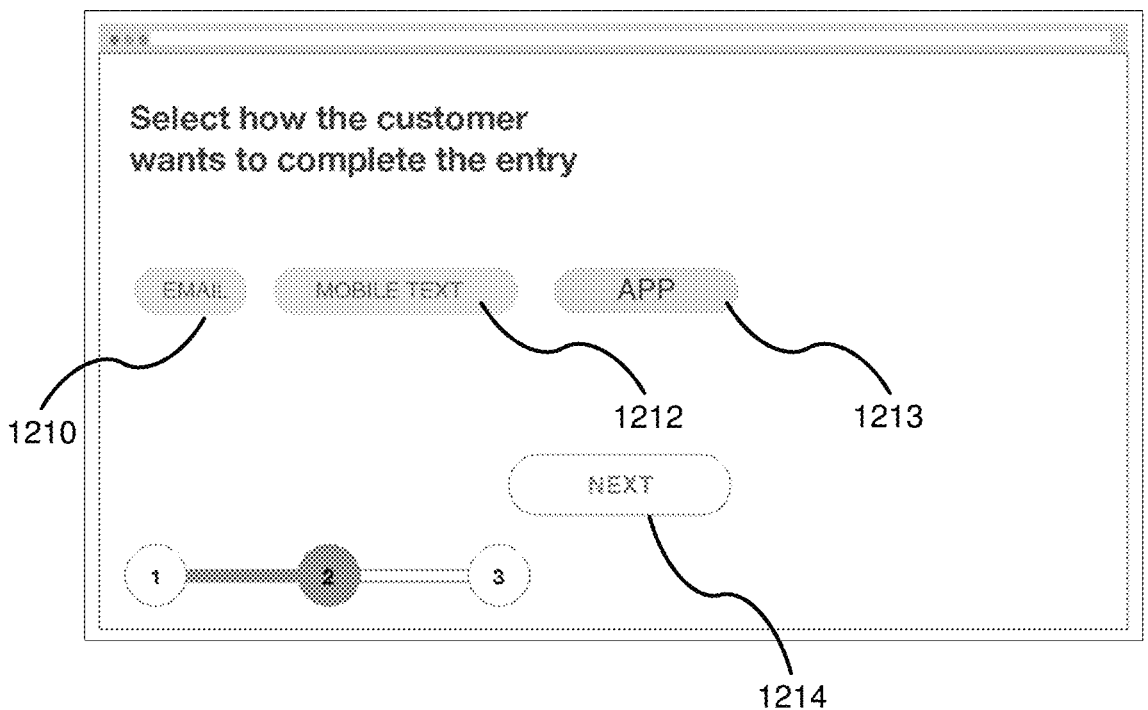

An example completion option web page 1200 is shown in FIG. 12 and offers two or more options for how the customer desires to complete the payment process. In the illustrated screen 1200, the options include an email option 1210, a mobile text option 1212, or "in app" option 1213. The user can determine the customer's preference during a phone call, video chat session, or real-time messaging session with the customer. Once the user inputs the customer's completion option preference, then the user can select a "next" button 1214. The displayed options should not be construed as limiting, as other option may also be presented.

At 514, customer contact data is input. For example, the input can be received via a customer contact data web page displayed to the user. In still other embodiments, the method can include accessing the relevant customer contact from a database storing the customer information.

Figure 13:
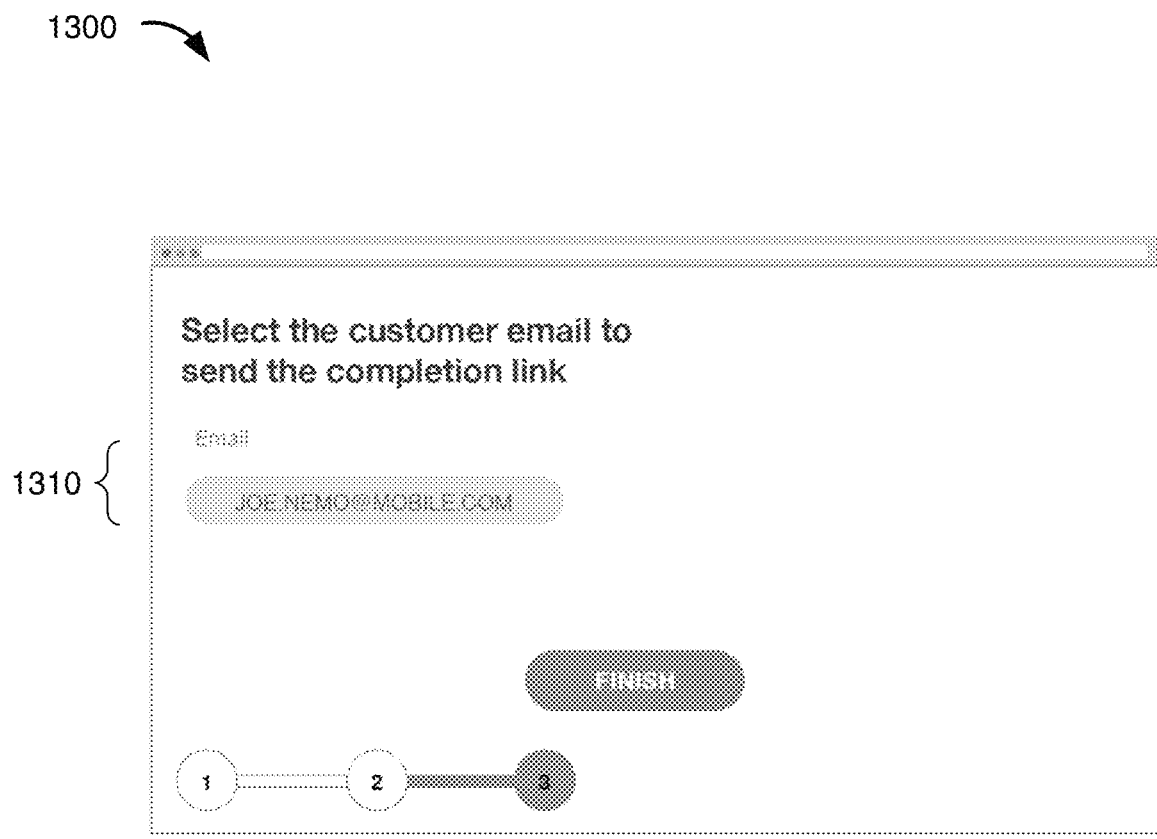

An example customer contact data web page 1300 is shown in FIG. 13. Depending on the option selected at 512, the customer contact data screen 1300 can include an input window 1310 for inputting the customer's email, or an input window for the customer's phone number, or an input window for another contact point for the customer.

At 516, a URL, other website link, text message (e.g., an MMS or SMS message), or message sent via a dedicated app operating on a mobile device operated by the customer is transmitted to the customer in accordance with the customer's preference. For instance, a text message can be sent to the customer that simply asks for the remaining 7 or 8 digits of the card number, in which case the method acts 518, 520, and 522 may be bypassed.

At 518, the URL, other website link, text message, or app message is received and executed by the customer's computing device (e.g., by the customer navigating to the URL, clicking on the link, opening the message, or viewing the message in an application). For cases where a URL or website link is transmitted, the URL or website link can then access a web page for allowing the customer to finalize the transaction.

At 520, for cases where a URL or website link is transmitted, the request to navigate to the web page is received and the requested web page is generated and transmitted to the customer.

At 522, the customer's computing device receives and renders the requested web page, receives the requested remaining portion of the credit card information, and transmits it to the secure payment airlock interface server 130.

Figure 14:
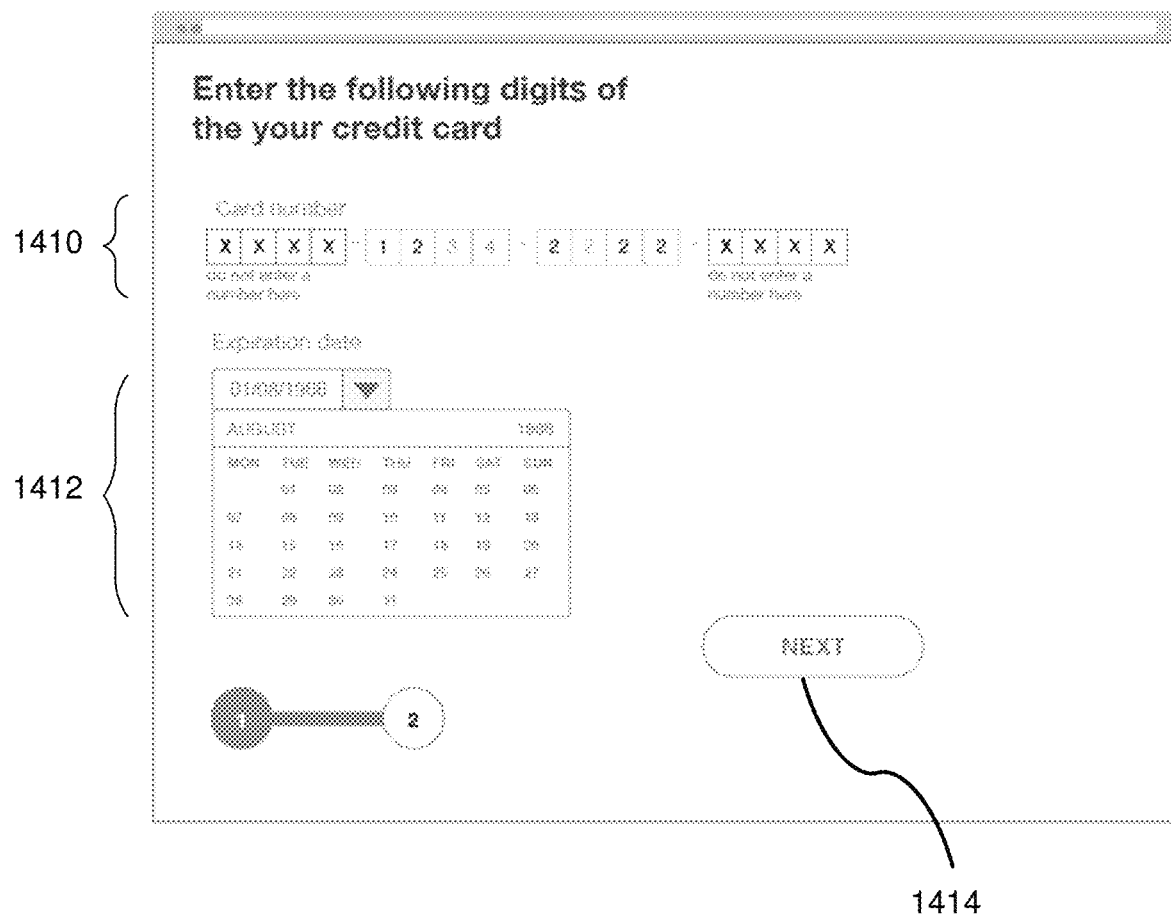

An example credit card completion web page 1400 as can appear to the customer is shown in FIG. 14. The web page 1400 includes a credit card number completion portion 1410 and an expiration date selection portion 1412. As shown, the web page 1400 allows for the remaining credit card numbers to be entered by the customer (the numbers not entered previously during the partial credit card number collection process (e.g., via web page 1100)). Once the numbers have been inserted, the customer can select "next" 1414 to proceed to a further web page (e.g., a confirmation web page). Additional information can also be collected from the 1400, such as the CSV number.

Figure 15:
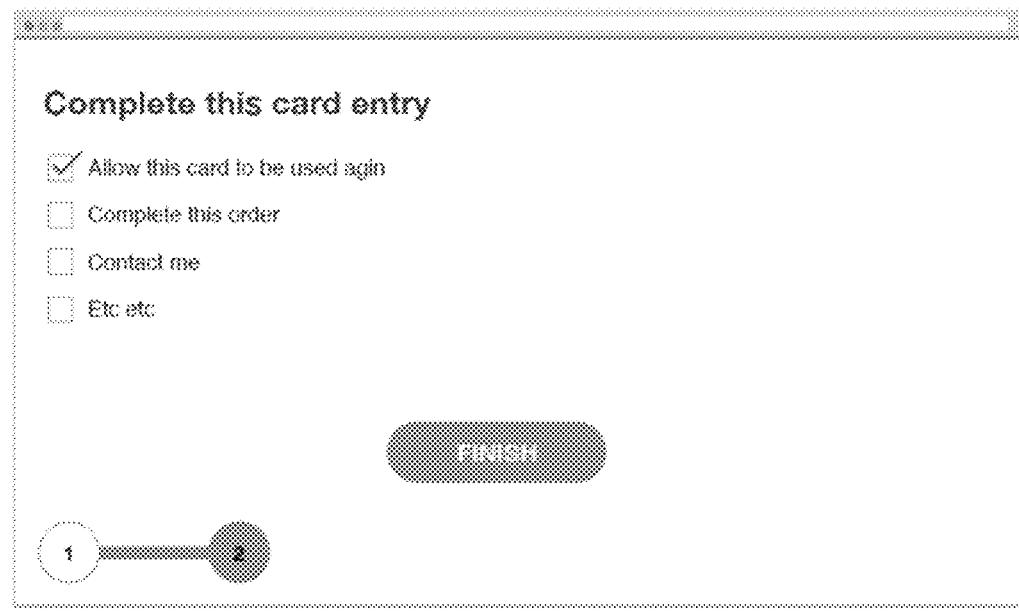

Optionally, a confirmation web page is then transmitted to the customer's computing device after delivery of the credit card completion web page 1400. An example confirmation web page 1500 is shown in FIG. 15. The web page 1500 presents the user with a number of options concerning the completion of the transaction. In the illustrated embodiment, the user can select to perform one or more of: (a) allow the card to be used again (e.g., a token created for the card that can be re-used); (b) complete the order; and/or (c) require further contact (e.g., a phone call, email, or other contact) before completing the order. Other options may also be present, such as showing order details, invoice details, or linking to a shopping cart.

Returning to FIG. 5, at 524, the secure payment airlock interface server 130 receives the remaining portion of the credit card number from the customer.

At 526, the secure payment airlock interface server 130 combines the received remaining portion of the credit card number from the customer with the previously received data from the merchant server 120 to create a complete record of the customer's credit card number. The complete record may also include the expiration date and/or the CSV number on the credit card.

At 528, the complete record is sent to the payment processor server 140. The transmission can further include a request to authorize the credit card and/or generate a token for completing the transaction.

At 530, the credit card information is optionally authorized, by the payment processor server 140, to confirm that the credit card exists and, in some cases, has an available balance or credit limit to permit the transaction to continue.

At 531, a token is generated by the payment processor server. In particular embodiments, the token can represent an encryption of the credit card number and the reference ID. In some embodiments, the payment processor server 140 is used to tokenize the credit card number. For example, the secure payment airlock interface server 130 can transmit the full credit card number to the payment processor server 140 for tokenization, and the payment processor server 140 can receive the tokenization request (along with the credit card number), generate a token, and transmit it back to the secure payment airlock interface server 130, as shown in 531.

At 532, the token is stored at the secure payment airlock interface server 130. At this point, the "lodging" of the credit card information is complete.

At 534, data indicating that the transaction is confirmed and ready to be completed is transmitted to the merchant server 120. In some embodiments, an email or message is sent to the merchant server 120 or a representative of the merchant indicating that the transaction is ready to be completed. In particular embodiments, the data includes data sufficient to identify the transaction that has been authorized. For example, the "reference ID" and/or "originating ID" can be transmitted as part of the data. Further, this data can be encrypted.

At 536, the data indicating that the transaction is confirmed and ready to be completed is received by the merchant server 120. For example, the merchant server 120 can receive a notification (e.g., an email or message) through a merchant dashboard, merchant portal, or in an enterprise resource planning (ERP) module that the card lodging has been completed. In some embodiments, if there was a problem, the user (or the user's server) can re-send a new link. If the card was lodged, the user can proceed with the order. If there was a problem, the user (or the user's server) can advise the customer.

Figure 5A:
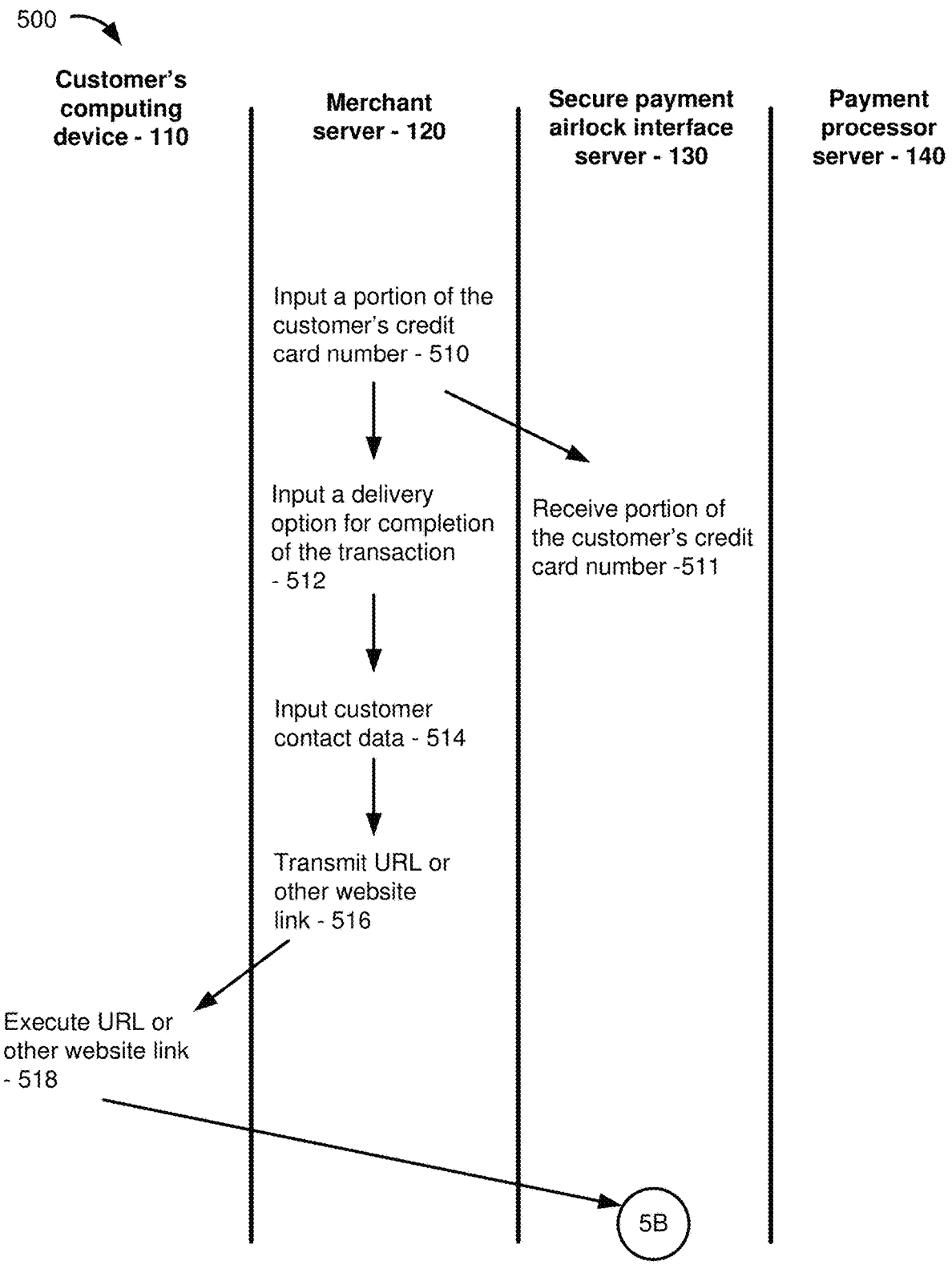
FIGS. 5A-D are schematic block diagrams illustrating an example network configuration and series of communications between the network elements for completing a transaction among distributed devices in accordance with a second embodiment of the disclosed technology.
Figure 5B:
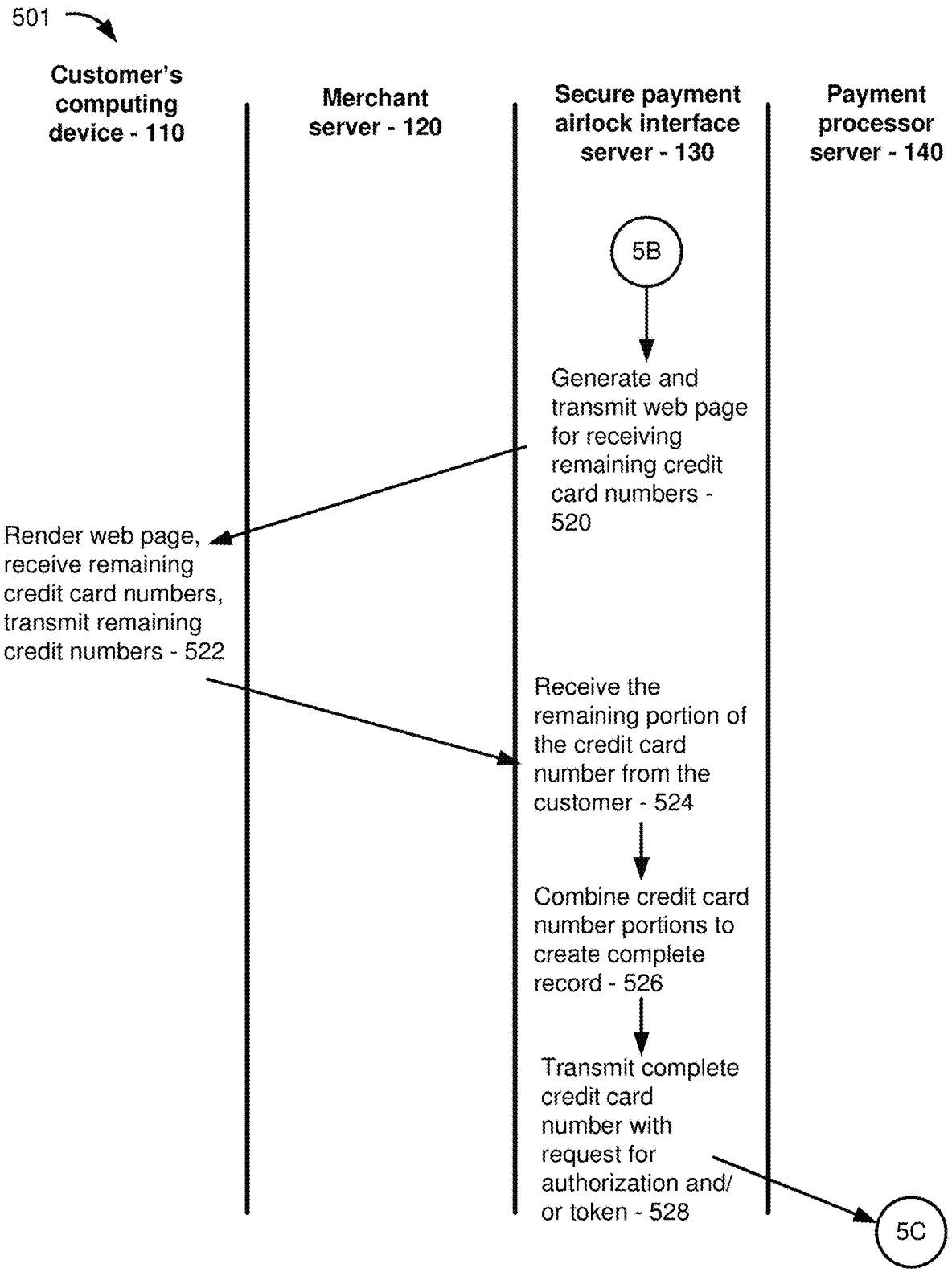
Figure 5C:
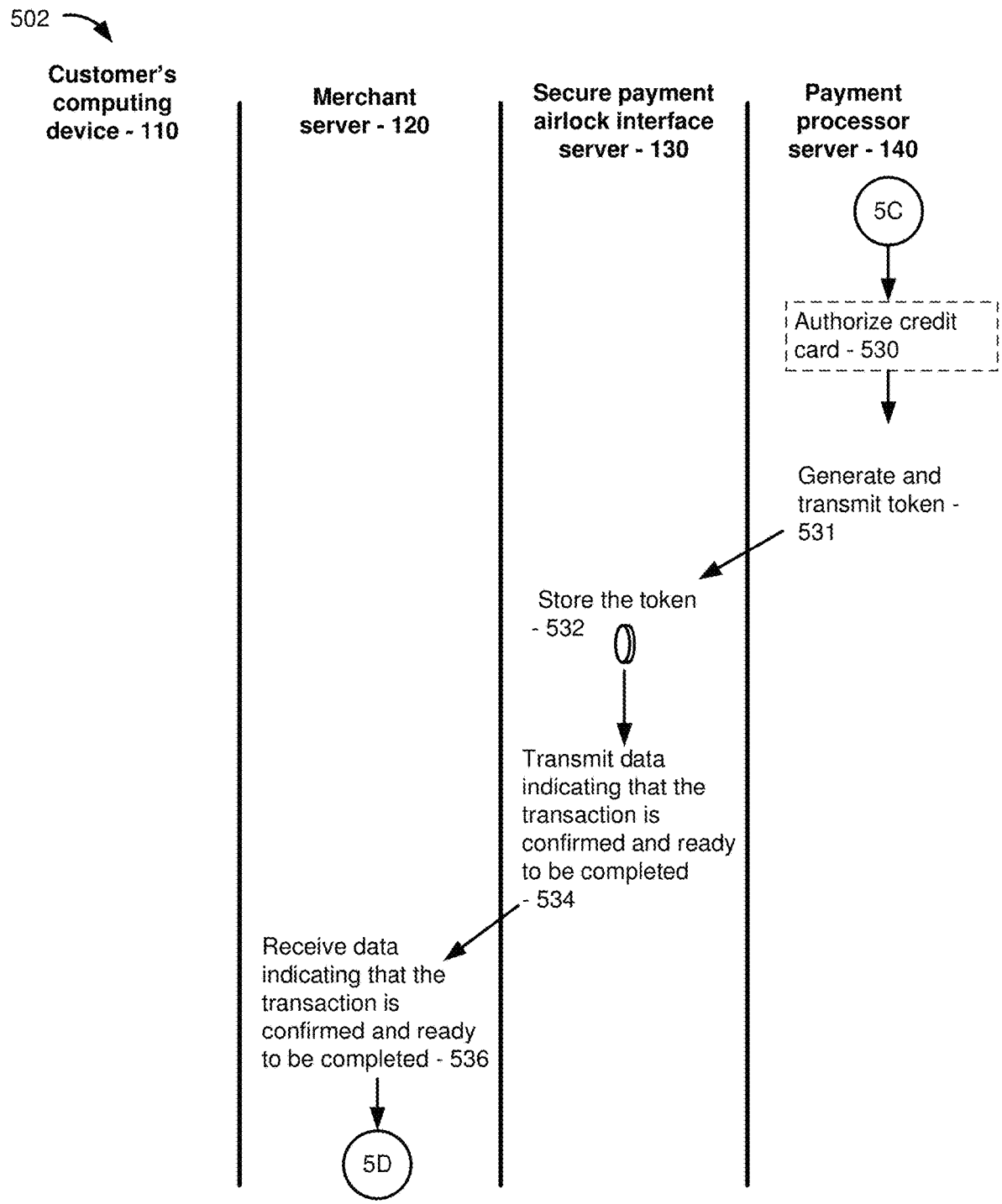
Figure 5D:
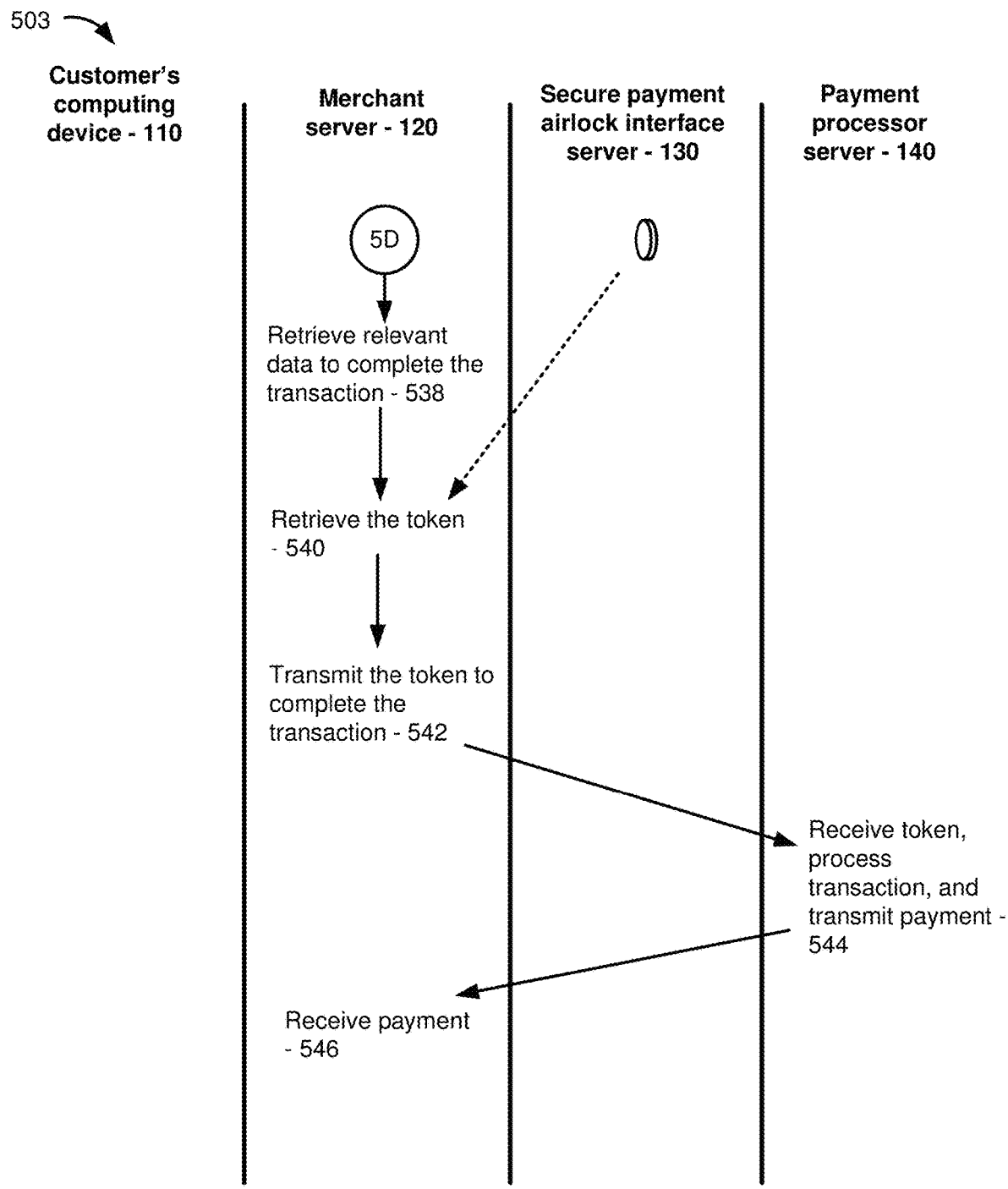
Figure 6:
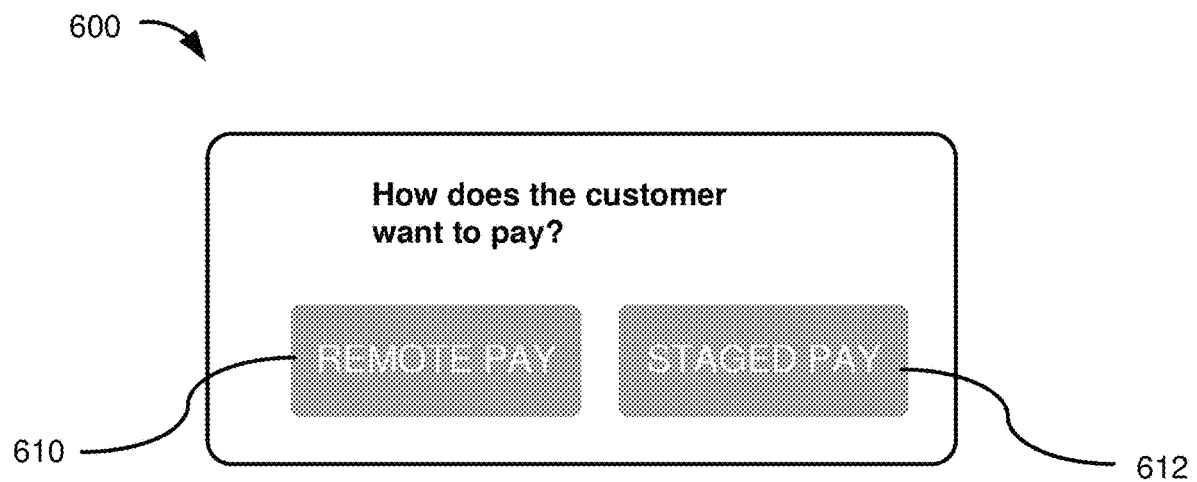
FIG. 6 is a block diagram showing an example user interface for selecting a secure payment process from among multiple options.

Turning now to FIG. 5D, at 538, the merchant server 120 can retrieve relevant data to complete the transaction. For example, the "reference ID" can be retrieved from the data received at 536. The reference ID may represent multiple transactions (e.g., multiple items or services to be purchased) in a single reference ID, or multiple reference IDs can be employed for such transactions.

At 540, the merchant server 120 retrieves the token (e.g., the token generated for the transaction) from the secure payment airlock interface server 130. This action can be performed by the merchant dashboard, merchant portal, or merchant ERP module.

At 542, the token is transmitted from the merchant server 120 to the payment processor server 140 to complete the transaction. In particular, the token and other relevant transaction information are sent to the credit processor (e.g., the total price for the transaction).

At 544, the payment processor server 140 receives the token and other relevant information and uses the token to process the credit card payment and transmit the payment to the merchant.

At 546, the payment is received, thereby completing the transaction.

Figure 16A:
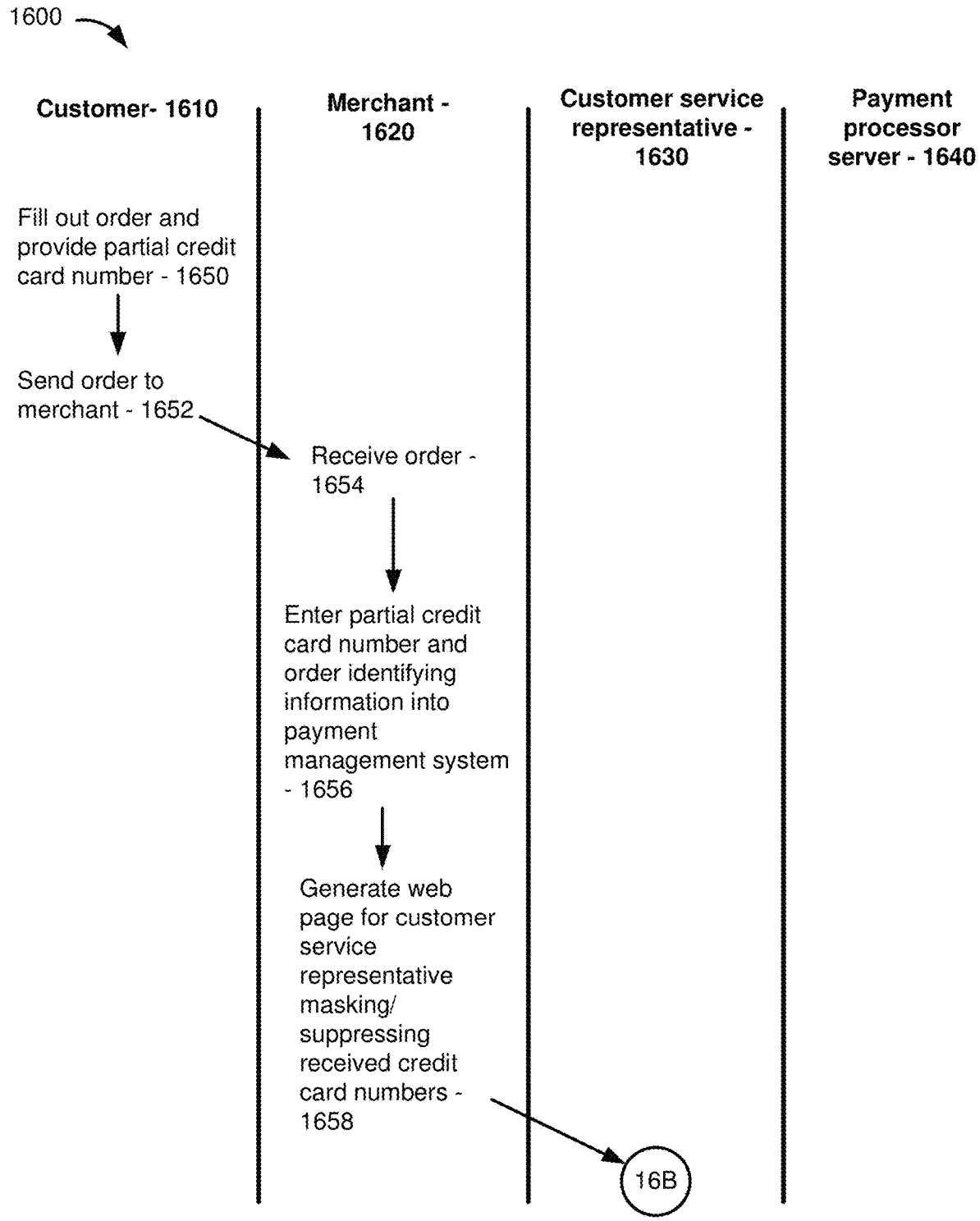
FIGS. 16A-16C are schematic block diagrams illustrating an example network configuration and series of communications between the network elements in accordance with a third embodiment of the disclosed technology.
Figure 16B:
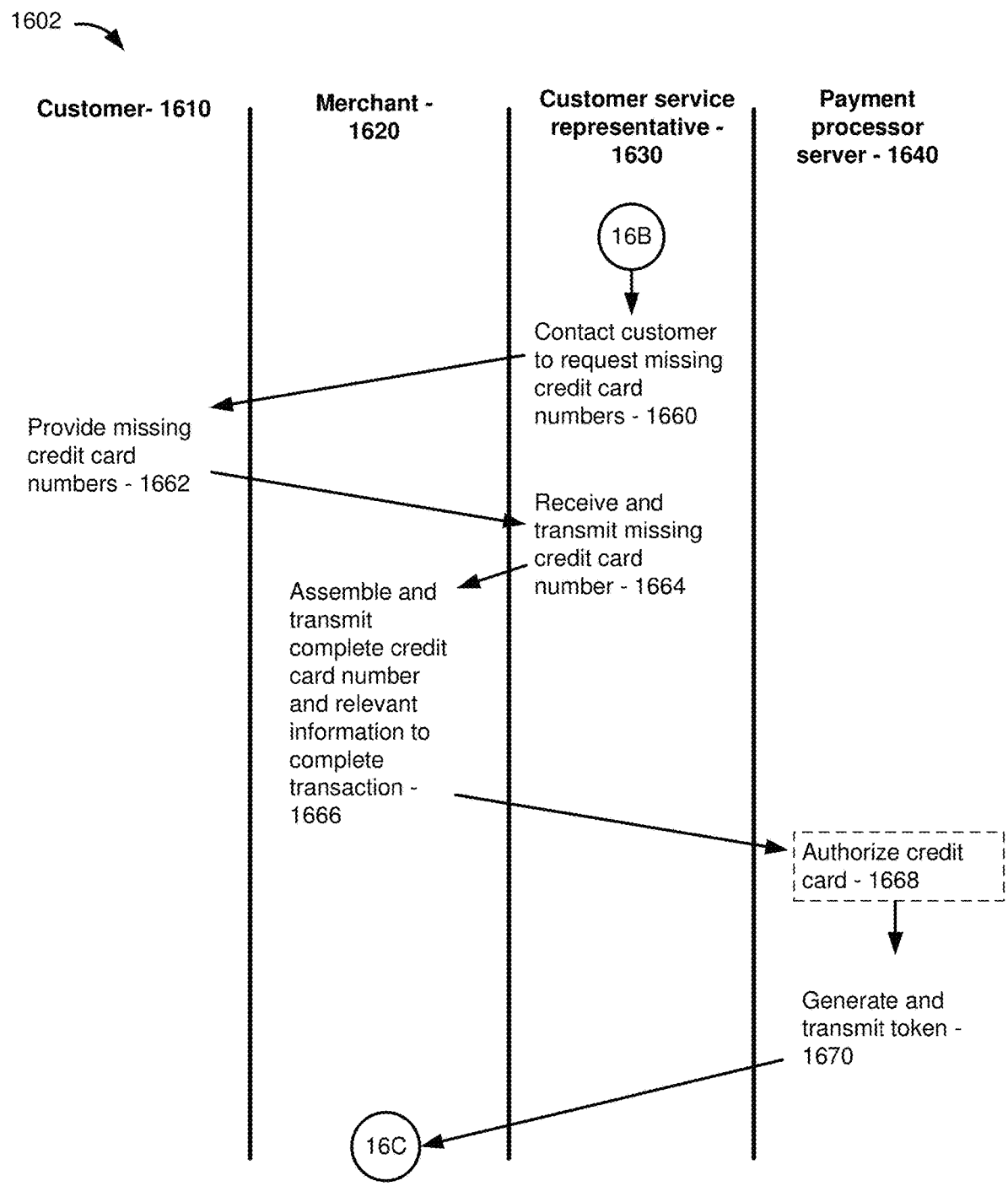

FIG. 16 shows an example sequence of interactions that occur in a further embodiment of the disclosed technology. The embodiment shown in FIG. 16 is related to that shown in FIG. 5, but uses physical materials (e.g., paper envelopes, inserts, or slips) to request a portion (but not all) of a customer's credit card number. The illustrated interactions are shown by way of example only, as any one or more of the interactions may be omitted in certain embodiments, performed in a different sequence, performed concurrently, or replaced by some other actions. Also, additional interactions may also be included that are not illustrated here.

At 1650, a customer 1610 receives a physical order entry document (e.g., as part of a paper envelope, paper insert (such as an insert in a catalog or magazine), or paper slip). Also at 1650, the physical order entry document is filled out by the customer. In accordance with particular embodiments of the disclosed technology, the customer provides only a partial credit number on the order entry document.

Figure 17:
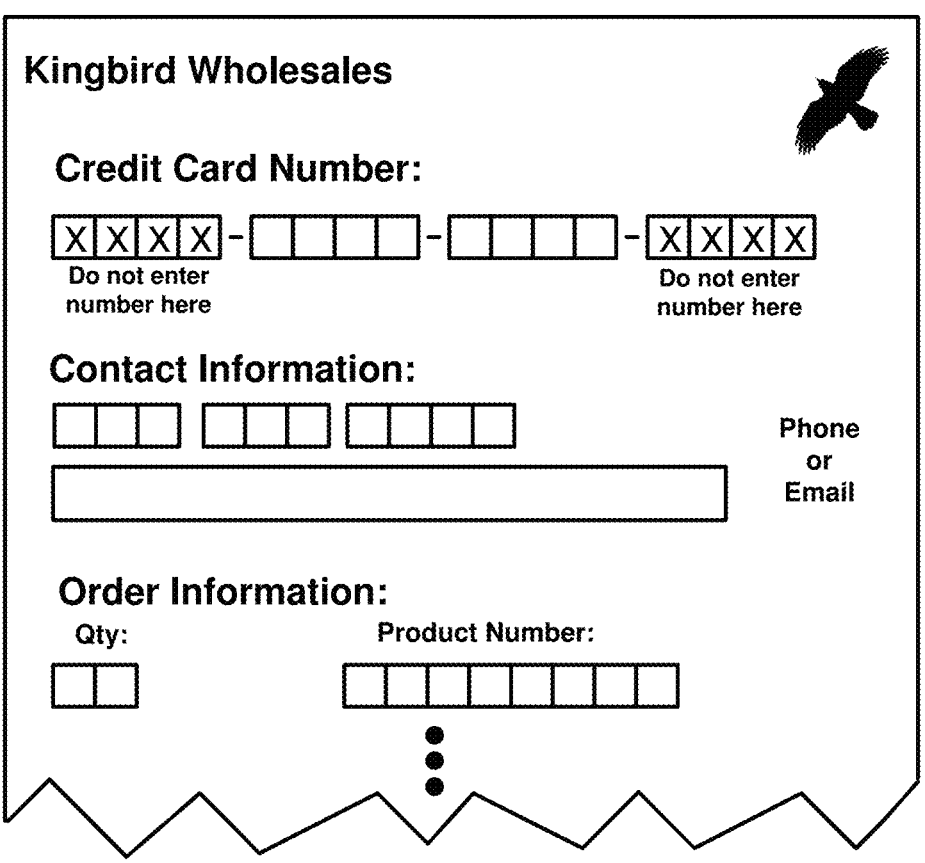
FIG. 17 is an example embodiment of a physical order entry document for use with the methodology shown in FIGS. 16A-16C.

An example physical order entry document 1700 is shown in FIG. 17. The example document 1700 can be part of an envelope, paper insert, or paper slip. As illustrated, the example physical order entry document 1700 includes a credit card entry portion 1710 in which the customer is requested to enter a portion of the customer's credit card number. The portion requested can be any portion (e.g., in any position and/or in any number of positions). In the illustrated embodiment, the numbers requested are the middle eight values of the customer's credit card number. A contact information entry portion 1712 is also provided in which the customer provides contact information that a customer service representative can use to contact the customer to obtain certain additional information (e.g., the missing credit card numbers). In the illustrated embodiment, the entry portion 1712 requests one of a phone number or an email address, but it can request other contact information. An order information portion 1714 is also provided in which the customer is requested to provide details concerning the items the customer desires to purchase. A wide variety of information can be requested from the customer, but in the illustrated embodiment the order information includes a quantity and a product number. Although only one order information portion 1714 is shown, multiple entry sections can be provided.

The physical order entry document 1700 can also request additional identifying information, such as a catalog serial number of customer ID number.

At 1652, the physical order entry document is sent to the merchant 1620. For instance, the physical order entry document can be mailed or transmitted (e.g., via a digital transmission) to the merchant 1620.

At 1654, the merchant 1620 receives the order entry document.

At 1656, a representative of the merchant 1620 inputs the information from the physical order entry document into a payment management system (e.g., a payment management application executing on a server hosted by the merchant).

At 1658, a web page is generated and rendered for viewing by a customer service representative. In particular embodiments, the web page does not display the credit card numbers previously provided by the customer. Desirably, the customer service representative is a person different from the representative of the merchant who entered the information 1656. For instance, the customer server representative can be a third-party representative completely separate from the merchant.

Figure 18:
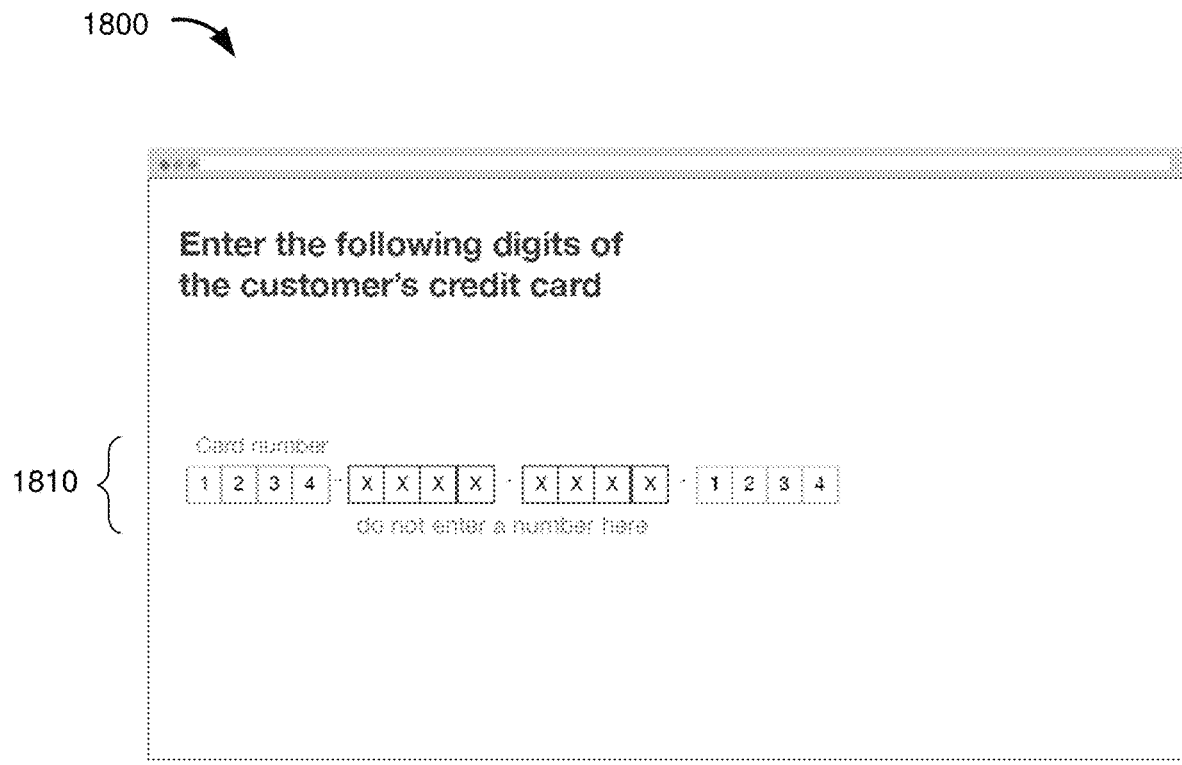
FIG. 18 is an example screen shot for providing missing credit card numbers for use with the methodology shown in FIGS. 16A-16C.

An example web page 1800 is shown in FIG. 18 and prompts a customer service representative to enter the missing digits from a customer's credit card. The missing digits can appear in fillable portions of the web page whereas the previously received digits can be masked or otherwise suppressed from view of the customer service representative.

At 1660, the customer service representative 1630 uses the web page from 1658 to insert the missing information. For example, the customer service representative can contact customer (e.g., via phone, email, text message, or other mechanism) and ask for the remaining credit card number (and any other relevant information to complete the transaction). In some embodiments, the customer service representative is a live, human representative, though the disclosed technology also encompasses automated representatives for the customer service representative role at 1630.

At 1662, the customer communicates with the customer service representative 1630 and provides the missing credit card number information (along with any other outstanding information to complete the transaction).

At 1664, the missing credit card number information is received by the customer service representative 1630 and transmitted to the server operated by the merchant 1620.

At 1666, at the merchant's server (e.g., and via the merchant's payment management system), the complete credit card number is assembled along with any other relevant information to tokenize the transaction and transmitted to the payment processor server 1640.

At 1668, the credit card information is optionally authorized (e.g., by the payment processor server 1640) to confirm that the credit card exists and, in some cases, has an available balance or credit limit to permit the transaction to continue.

At 1670, a token is generated (e.g., by the payment processor server 1640). In particular embodiments, the token can represent an encryption of the credit card number and the reference ID. For instance, the token or "profile" can be a number or alpha numeric representation of the credit card number from the customer that is then provided by the payment processor to the merchant. This token or profile can be either one value or more (e.g., two), depending on the payment processor. In each case, the value is unique between the processor and the merchant and is only valid between the two.

Figure 16C:
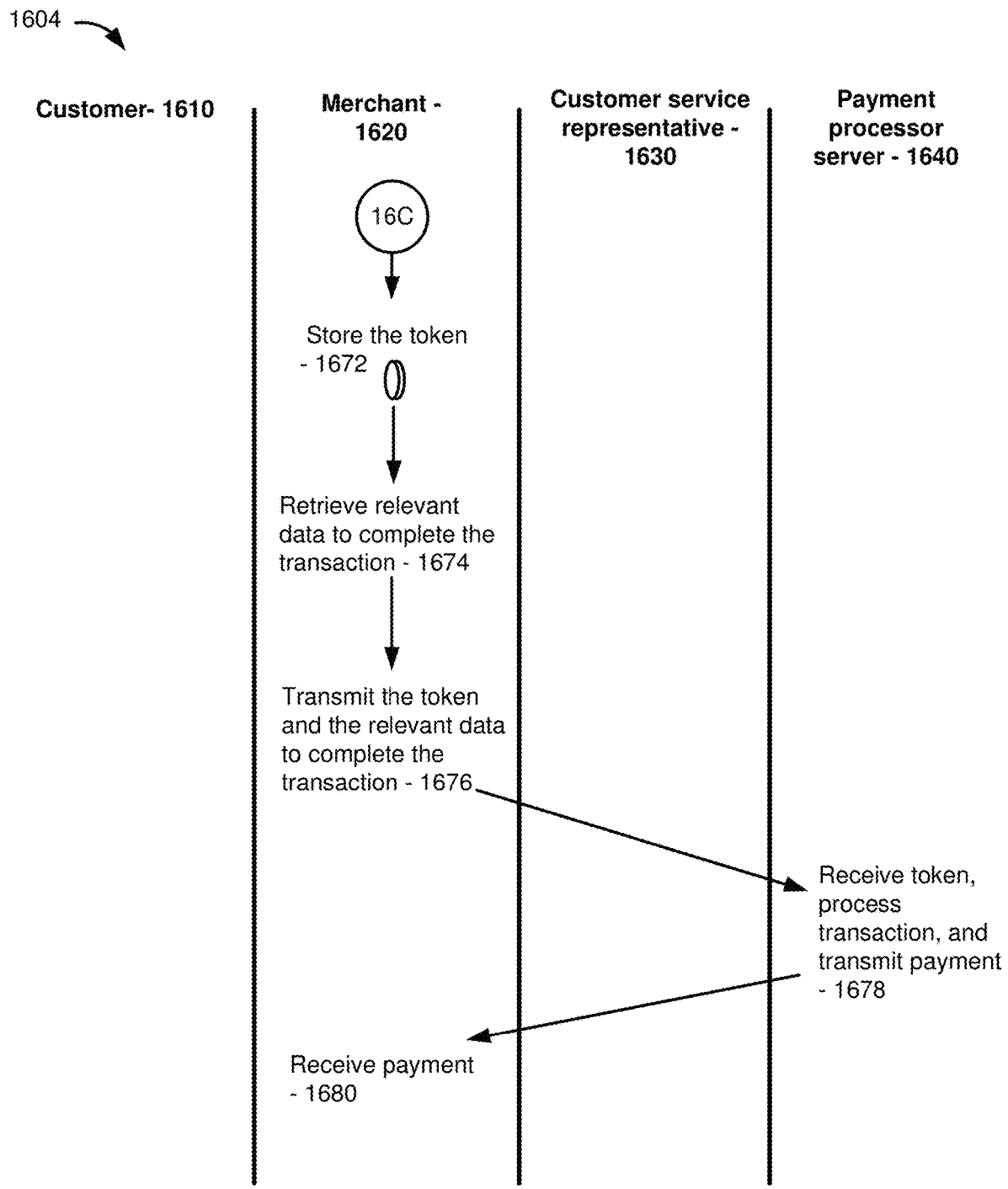

Turning now to FIG. 16C, at 1672, the token is stored at the merchant server 1620. At this point, the "lodging" of the credit card information is complete.

At 1674, data relevant to the transaction (e.g., the total payment for the transaction, unique ID for identifying the transaction (which can be used to then identify the goods/services associated with the transaction), or other relevant data) can be retrieved.

At 1676, the token and any data relevant to the transaction are sent to the payment processor server 1640 (e.g., the total payment for the transaction, unique ID for identifying the transaction (which can be used to then identify the goods/services associated with the transaction), or other relevant data).

At 1678, the payment processor server 1640 uses the token to process the credit card payment and transmit the payment to the merchant (the merchant's server) 1620.

At 1680, the payment is received at the merchant (the merchant's server) 1620, thereby completing the transaction. In some cases, other transactions may follow (e.g., to refund the customer's money, void transactions, or convert authorizations to captures).

FIGS. 19A-19D are schematic block diagrams 1900-1930 illustrating an example embodiment for completing a digital transaction in a secure manner in accordance with the disclosed technology. The example embodiment of FIGS. 19A-19D is adapted for use in a service or retail environment. By way of example, a restaurant environment is described, though the disclosed technology can be adapted for use in an array of retail environments. The mechanisms can be used, for instance, to prevent a customer's complete credit card number from being received by a merchant. Such embodiments can thus allow the merchant to reduce or avoid PCI DSS audit or reporting requirements.

More specifically, FIGS. 19A-19D are schematic block diagrams 1900-1903 illustrating an example network configuration and series of communications between the network elements. The network configuration includes a customer's computing device 160 (e.g., a mobile device, laptop, tablet, or PC operating any of a variety of operating systems or platforms, such as Windows, Unix, IOS, or Android), a merchant system/server 120 (e.g., a system or server that is accessed by a merchant representative, such as a waiter or other customer service representative, as part of a transaction with the customer), a secure payment airlock interface server 130 (e.g., a server operated by a party/entity different than the merchant, the customer, the credit card provider, and the payment processor), and a payment processor server 140 (e.g., a server operated by a party/entity different than the merchant, the customer, the credit card provider, and the secure payment airlock interface provider). The illustrated interactions are shown by way of example only, as any one or more of the interactions may be omitted in certain embodiments, performed in a different sequence, performed concurrently, or replaced by some other actions. Also, additional interactions may also be included that are not illustrated here.

At 1910, a request to close a customer's ticket is received at a merchant's system or server. For instance, in a restaurant, the merchant's system can be the restaurant's local point of sale system or other ticket management system (which may be implemented by a local computing device or a local or distributed server). The request can be received by a merchant representative (e.g., a waiter) operating the merchant system/server 120.

At 1912, an originating identification value (e.g., a unique "originating ID") is generated and sent to a remote secure payment airlock interface server 130. The originating identification can correspond to a sales order, invoice, project, job, or other desired transaction. A merchant identification (e.g., a unique ID for the merchant requesting the transaction) can also be sent to the secure payment airlock interface server 130. In some embodiments, for example, the merchant identification can be embedded into the originating ID. For instance, a fixed set of number values in the originating ID can be dedicated to identifying the merchant. In general, the originating ID serves as a transaction tracker and establishes a record in the secure payment airlock interface server for the transaction.

At 1914, the secure payment airlock interface server 130 receives the originating identification value and generates a transaction identification value ("transaction ID"). In some embodiments, this is performed by taking the originating identification value, combining it with a separate globally unique identifier ("GUID" or "UUID"), and encrypting both into an encrypted string (e.g., alphanumeric string) via a suitable encrypting technique (e.g., a suitable hashing algorithm, such as an MD5 or SHA algorithm). The resulting encrypted string is referred to herein as a reference identification (or "reference ID"). Further, in certain embodiments, the resulting reference ID is stored in a record associated with the originating ID.

At 1918, the reference ID is embedded into a code that encodes a URL embedding the reference ID and transmitted to the merchant/system server 120. In the illustrated embodiment, the code is a scannable code (such as a bar code or QR code). For illustrative purposes, the code will be described as a QR code that encodes a URL with the reference ID embedded into the URL. For instance, the reference ID can form part of an URL. One example format for the URL is: http://www.remotepay.com/[referenceId], or http://www.stagedpay.com/[referenceId].

In the illustrated embodiment, the code is generated by the secure payment airlock interface server 130, but in other embodiments, the reference ID is transmitted to the merchant system/server 120, which then generates the code (e.g., the bar code or QR code) encoding the URL.

Figure 20:
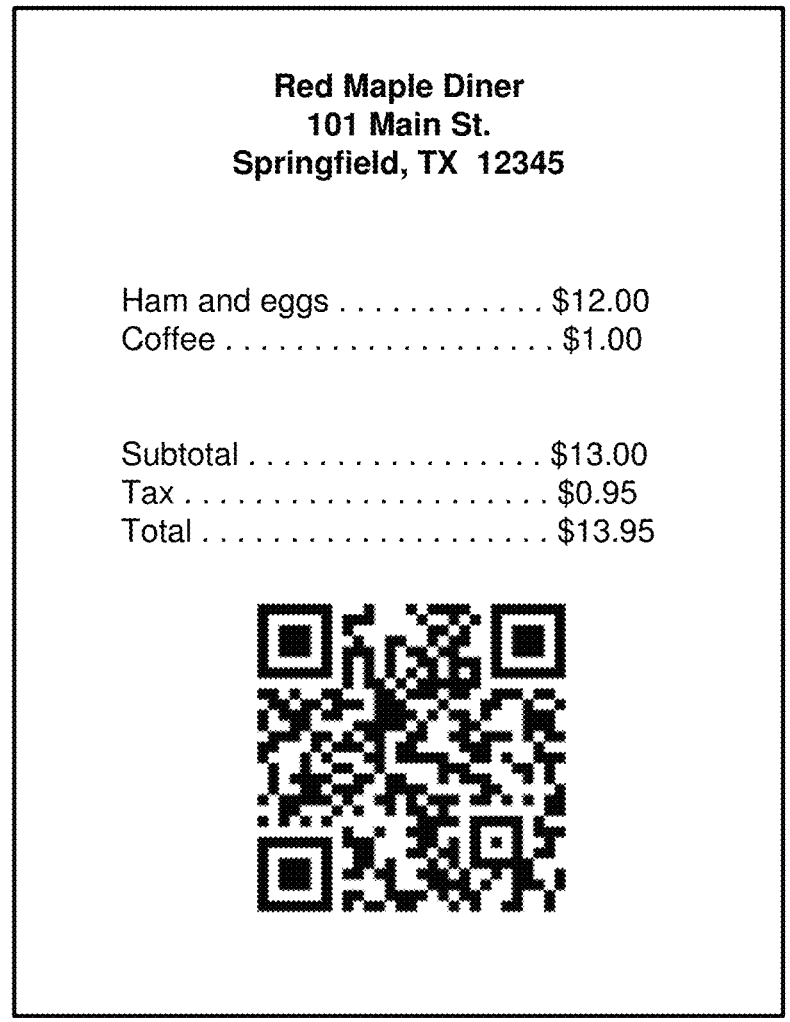
FIG. 20 is a schematic diagram of an example merchant printout for presentation to a customer in accordance with an embodiment of the disclosed technology.

At 1918, the code is printed (or displayed on a display device) for scanning by the customer's computing device 110. For instance, the code can be included as part of a printed tab that is presented to the customer. An example of such a tab is illustrated in example 2000 shown in FIG. 20. The example 2000 resembles a typical restaurant tab and identifies the name of the restaurant, an itemization section 2010 of the food and/or drinks that were ordered along with their respective prices, a tabulation section 2012 that shows, for instance, the subtotal, the tax (if applicable), and the grand total. The example 2000 further includes a QR code 2014 with the embedded URL.

At 1920, the customer's computing device (operated by the customer) decodes the code and retrieves the URL with the embedded reference ID. For instance, the camera of the customer's mobile device can be used to detect and decode the code and URL. This decoding can be performed using a variety of decoding applications or software modules (e.g., QR scanners) executing on the customer's computing device 110. For example, many mobile devices now have QR scanning built-in to their standard operating system so that when the camera is activated, the underlying operating system will detect the QR code and automatically create a selectable link to the embedded URL.

Figure 19A:
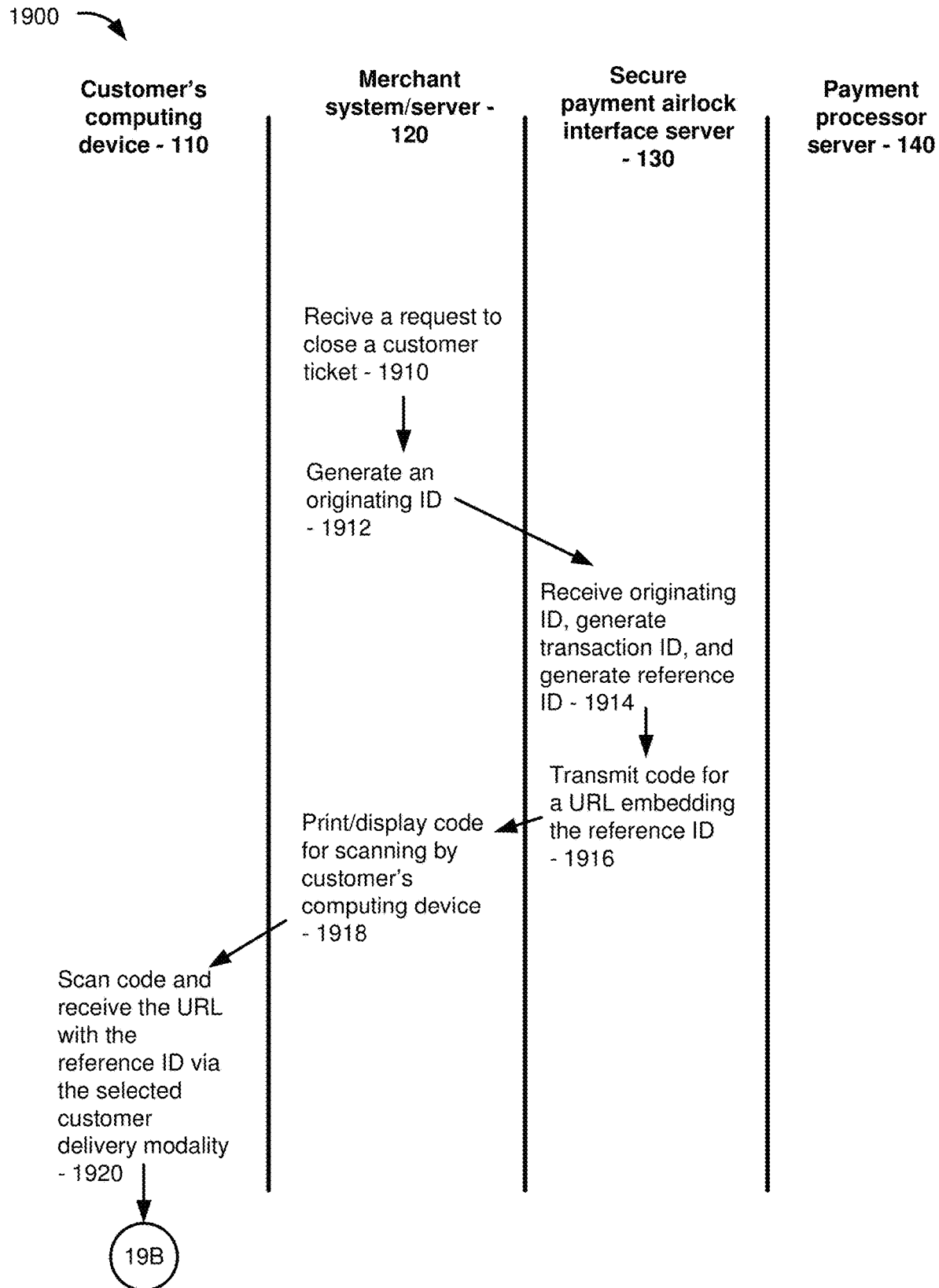
FIGS. 19A-19D are schematic block diagrams illustrating an example network configuration and series of communications between the network elements for completing a transaction among distributed devices in accordance with a third embodiment of the disclosed technology.
Figure 19B:
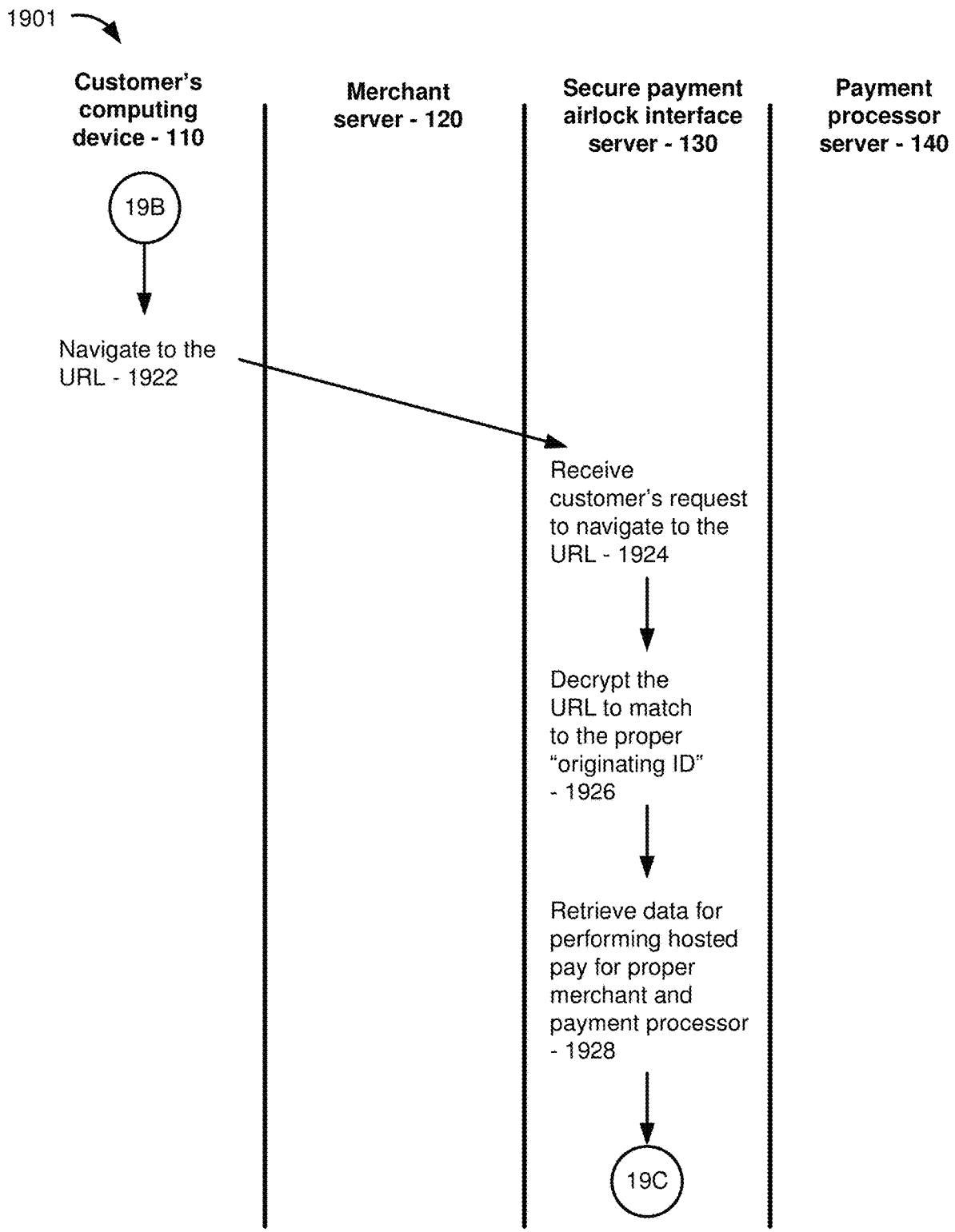
Figure 19C:
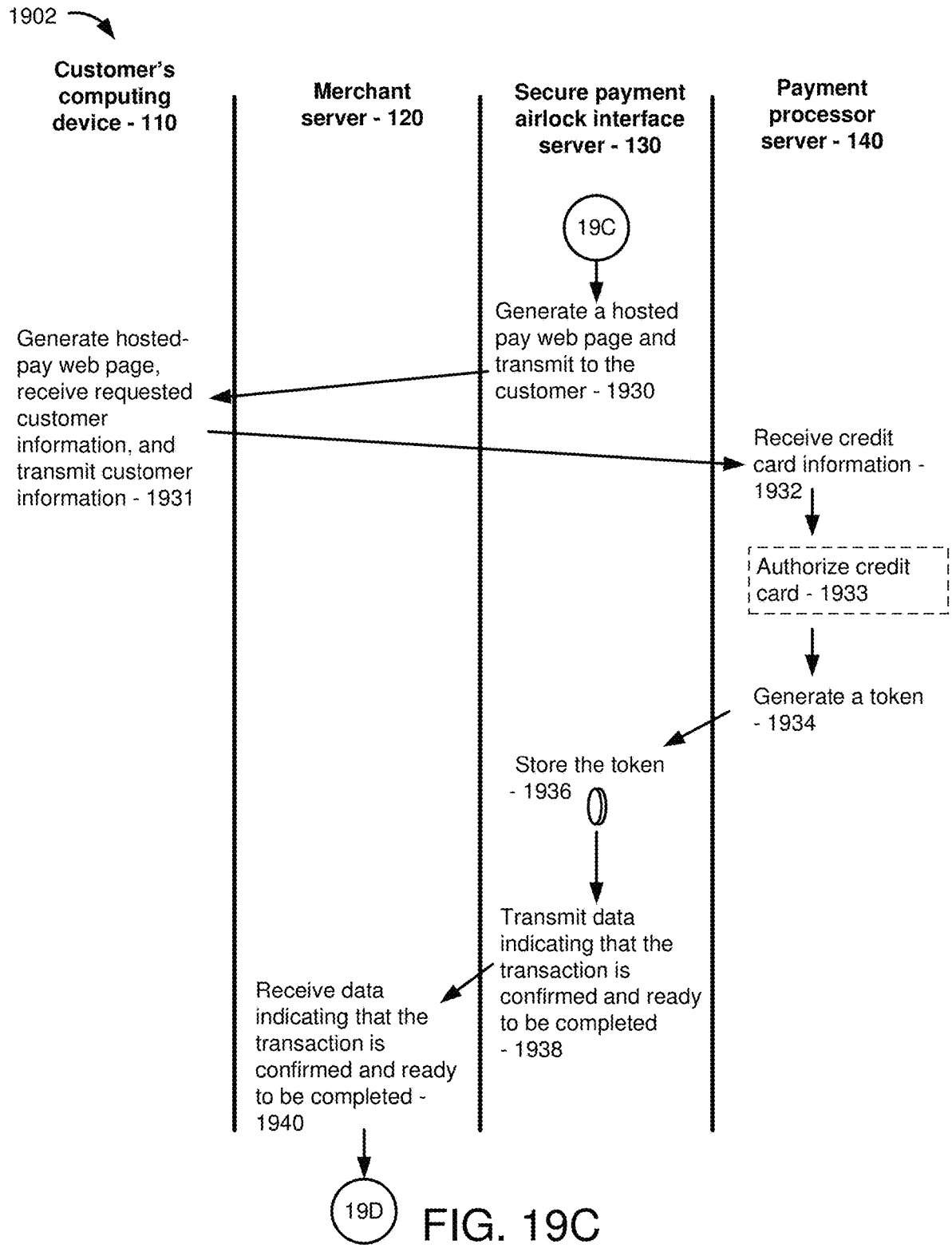

Referring to FIG. 19B, at 1922, the customer's computing device navigates to the URL (e.g., using a web browser executing on the customer's device). For instance, upon scanning the code, an executable link that opens a browser and automatically navigates to the received URL can be generated and selected by the customer.

At 1924, the secure payment airlock interface server 130 receives the customer's request to navigate to the URL (e.g., via a suitable HTML message).

At 1926, the secure payment airlock interface server 130 decrypts the URL to match to the proper "originating ID". This decryption is performed using the "reference ID" embedded in the URL.

At 1928, data is received for performing the remote payment process using the proper merchant and payment processor. For example, using an underlying database maintained by the secure payment provider (e.g., the entity/operator of the secure payment airlock interface server 130), the secure payment airlock interface server can recognize the underlying merchant (the proper merchant) and a selected payment processor used by the merchant. For instance, the underlying database can store record entries for each merchant that further include a record entry for identifying the payment processor (or payment processors) used by that merchant.

At 1930, a hosted-pay web page (as described in the above staged pay embodiments) is generated and transmitted to the customer. At 1931, the hosted-pay web page is generated at the customer's computing device, the relevant customer information is received from the user (e.g., credit card number, expiration date, and/or CSV number), and the relevant customer information is transmitted to the payment processor server 140 through the secure exchange offered by the payment processor window of the hosted-pay web page.

The hosted-pay web page typically includes merchant-specific text and images to create a "look and feel" for the web page that matches the merchant's own website. The hosted pay web page also includes an embedded third-party payment processor portion that is integrated within the web page but allows for a secure exchange of information only with the payment processor server 140. Thus, while surrounding text and imagery is customized for the merchant, the payment information requested and received by the customer is only exchanged between the customer and payment processor—not the merchant.

Such hosted pay web pages thus allow the merchant to reduce or avoid PCI DSS audit or reporting requirements. For instance, the link that is used by the customer is directed to a web page (e.g., hosted by the secure payment airlock interface server or by the merchant's server) that contains an iFrame that includes the merchant's payment processor's hosted-pay window where the customer can securely enter the customer's credit information into the web page.

In some embodiments, the hosted-pay website is hosted by the secure payment airlock interface server 130 as shown (but the hosted-pay window for the payment processor is hosted by the payment processor server 140). In other embodiments, the hosted-pay website is hosted by the merchant's server 120 (but the hosted-pay window for the payment processor is still hosted by the payment processor server 140). In the latter case, the secure payment airlock interface server 130 can redirect the customer to a URL hosted by the merchant's server with the proper information to continue processing the payment.

Figure 21:
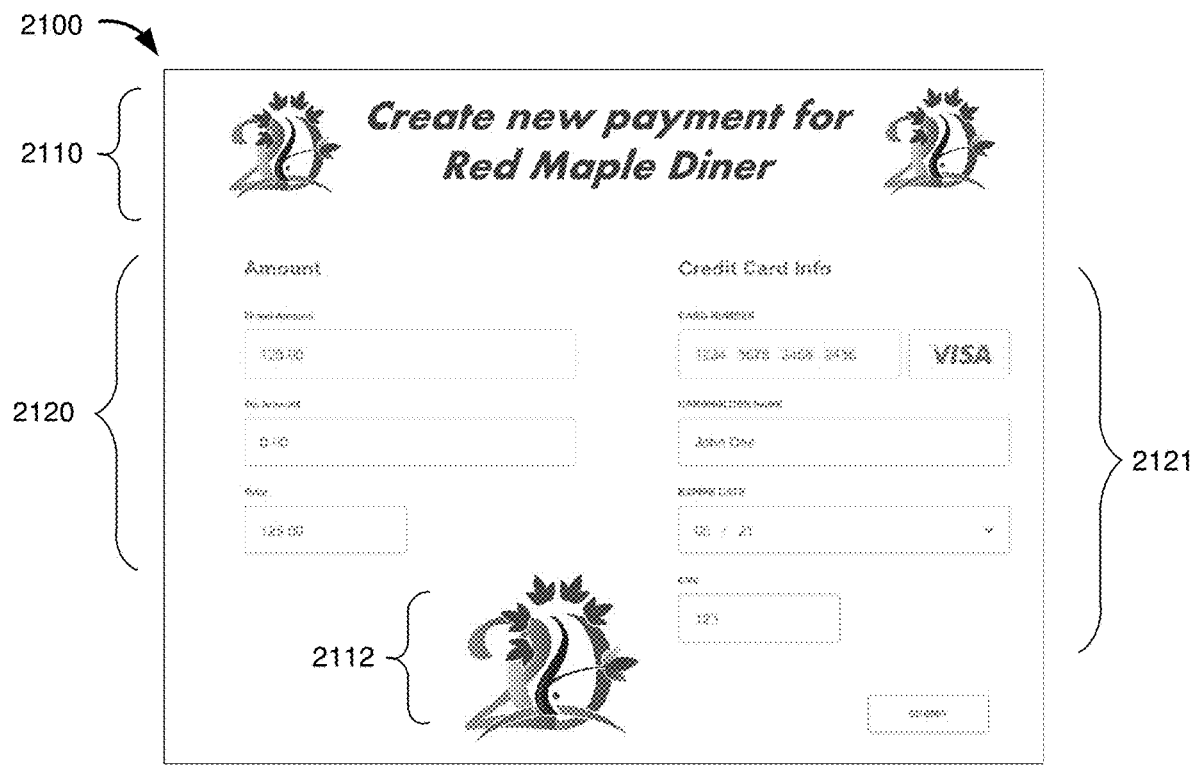
FIG. 21 shows an example screen shot for a hosted-pay web page in accordance with an embodiment of the disclosed technology.

An example screen shot for the hosted-pay website generated at 1930 is illustrated in example web page 2100 of FIG. 21. The web page 2100 can be displayed at the computing device 110 operated by the customer. As noted, the web page 2100 includes one or more portions that are merchant-specific (such as portions 2110 and 2112) as well as payment processor portions 2120 and 2121 embedded within the website to maintain the "look and feel" of the merchant's web experience. Via payment processor portion

2120, the customer is requested to input the amount the customer desires to pay, including an area for including a tip. Via payment processor portion 2121, the customer is requested to input the customer's credit card information (e.g., card number, cardholder name, expiration date, and CVV code).

Returning to FIG. 19C, at 1932, the credit-card information is received by the payment processor (e.g., the payment processor server 140).

Once the credit card information is submitted, a web page showing confirmation that the customer's credit card information has been received can be transmitted to the customer. In particular embodiments, the web page can comprise merchant customized text and imagery.

At 1933, the credit card information is optionally authorized (e.g., by the payment processor server 140) to confirm that the credit card exists and, in some cases, has an available balance or credit limit to permit the transaction to continue.

At 1934, a token is generated (e.g., by the payment processor server 140). In particular embodiments, the token can represent an encryption of the credit card number and the reference ID. For instance, the token or "profile" can be a number or alpha numeric representation of the credit card number from the customer that is then provided by the payment processor to the merchant. This token or profile can be either one value or more (e.g., two), depending on the payment processor. In each case, the value is unique between the processor and the merchant and is only valid between the two.

At 1936, the token is stored at the secure payment airlock interface server 130. At this point, the "lodging" of the credit card information is complete.

At 1938, data indicating that the transaction is confirmed and ready to be completed is transmitted to the merchant server 120. In some embodiments, an email or message is sent to merchant server 120 that the transaction is ready. In particular embodiments, the data can include data sufficient to identify the transaction that has been authorized. For example, the "reference ID" and/or "originating ID" can be transmitted as part of the data. Further, this data can be encrypted. For example, the originating ID can be encrypted with communication encryption, such as TLS1.2 or any other state-of-the-art HTTPS encryption. Because the originating ID and reference ID are included in the return information, the originating system can use these fields to lookup the original record and place the token and transaction ID with the correct transaction that started the transaction.

At 1940, the data indicating that the transaction is confirmed and ready to be completed is received by the merchant system/server 120. For example, the merchant system/server 120 can receive a notification (e.g., an email or message) through a merchant dashboard, merchant portal, or an enterprise resource planning (ERP) module that the card lodging has been completed. In some embodiments, if there was a problem, the user (or the user's server) can re-send a new link. If the card was lodged, the user can proceed with the order. If there was a problem, the user (or the user's server) can advise the customer.

Figure 19D:
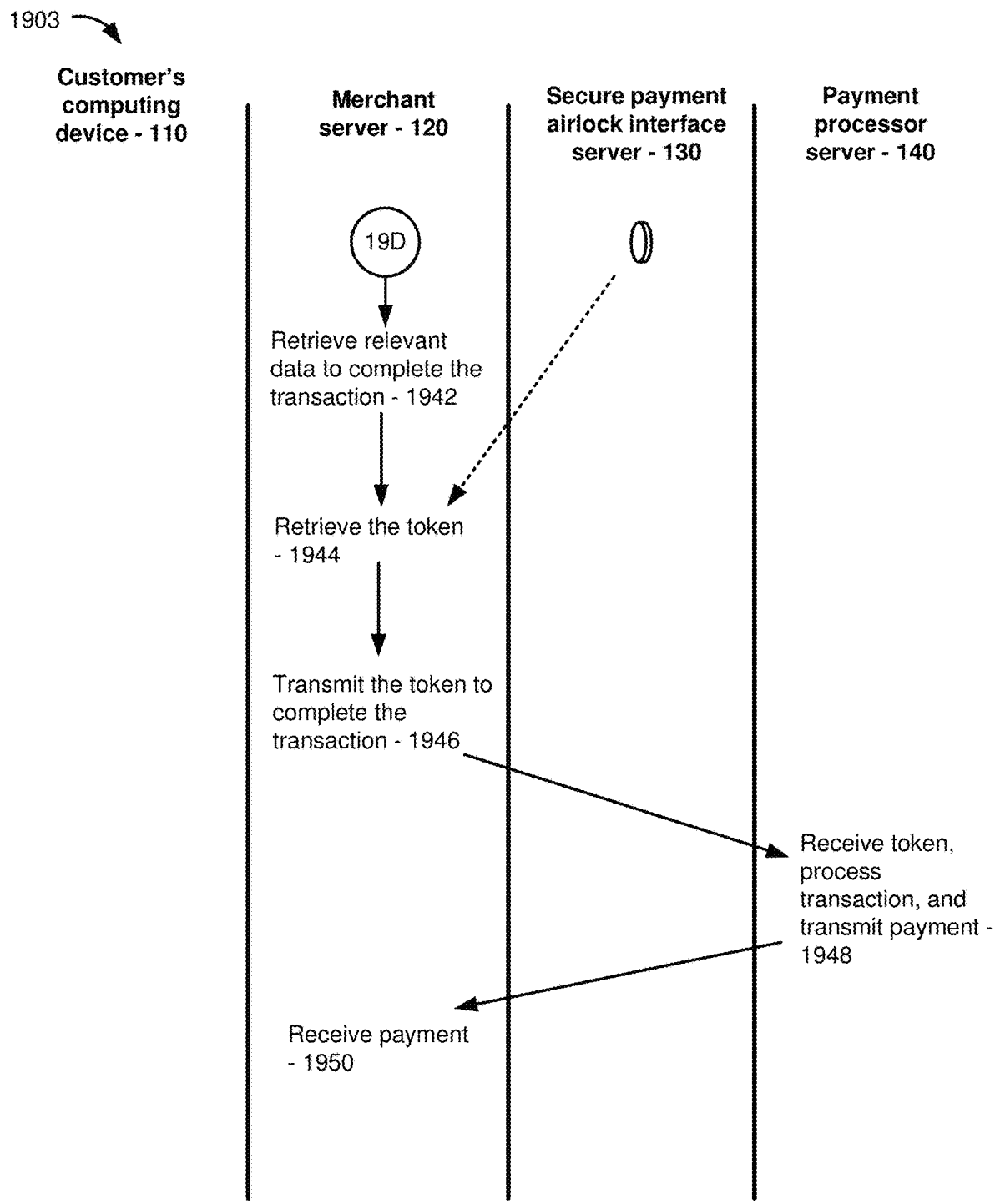

As shown in FIG. 19D, at 1942, the merchant server 120 retrieves relevant data to complete the transaction. For example, the "reference ID" can be retrieved from the data received at 1940. The reference ID may represent multiple transactions (e.g., multiple items or services to be purchased) in a single reference ID, or multiple reference IDs can be employed for such transactions.

At 1944, the merchant retrieves the token (e.g., the token generated for the transaction) from the secure payment airlock interface server 130. This action can be performed by the merchant dashboard, merchant portal, or merchant ERP module executing at the merchant system/server 120.

At 1946, the token is transmitted from the merchant system/server 120 to the payment processor server 140 to complete the transaction. In particular, the token and other relevant transaction information are sent to the payment processor server 140 (e.g., the total price for the transaction). As an example, consider a case where a customer wants to purchase an item (e.g., a meal). The merchant can finalize the transaction by transmitting the token to the payment processor server 140. When the token is received, the merchant will process and provide an authorization or sale transaction to the processor using the token (or profile) received instead of the actual credit card number, along with an amount and other information. The payment processor server 140 will receive the token and additional information (e.g., at 1948) in lieu of a credit card number and process the transaction as a valid transaction.

At 1948, the payment processor server 140 uses the token to process the credit card payment and transmit the payment to the merchant server 120.

At 1950, the payment is received at the merchant server 120, thereby completing the transaction. In some cases, other transactions may follow (e.g., to refund the customer's money, void transactions, or convert authorizations to captures).

IV. Further Example Screen Shots Showing Example Embodiments

FIGS. 22-35 show further example screen shots for embodiments of the disclosed secure payment process in accordance with the disclosed technology (e.g., an embodiment of FIGS. 5A-5D).

Figure 22:
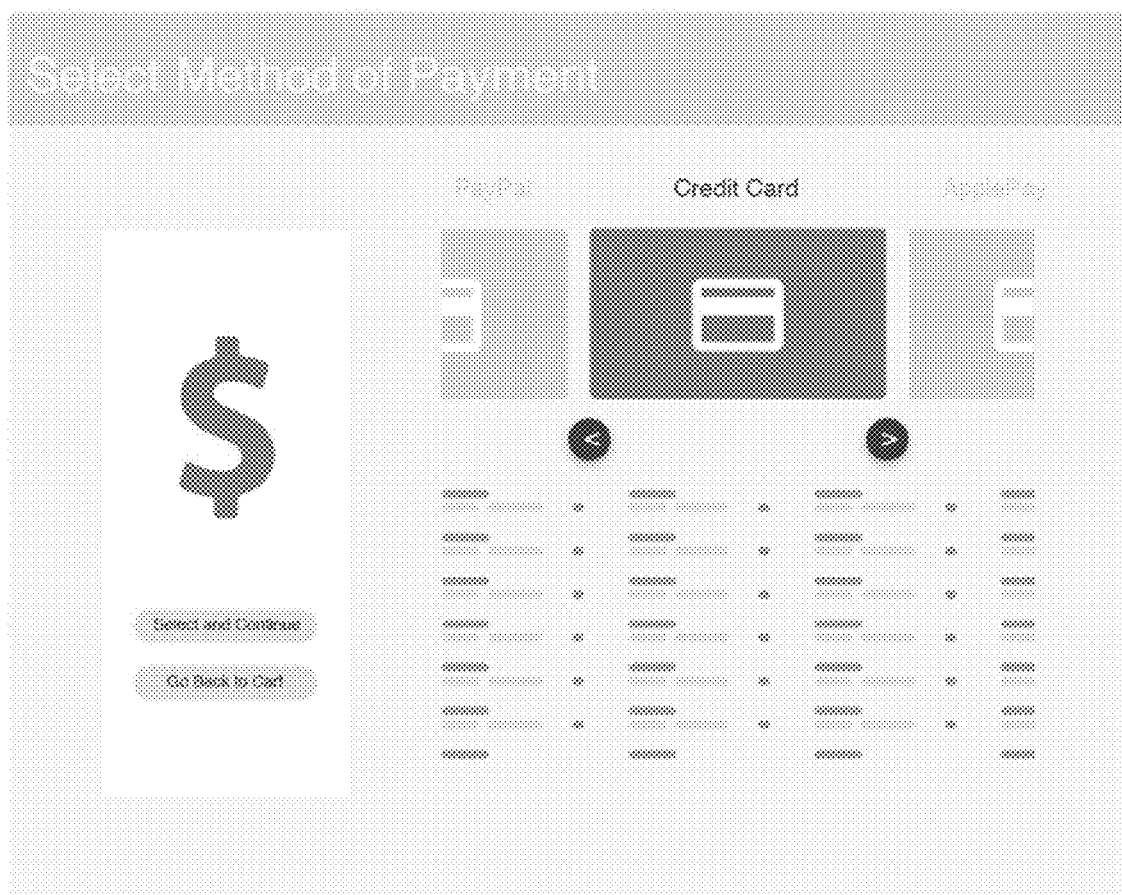

FIG. 22 shows an example screen shot 2200 that can appear on a device of a user making an internet purchase and that allows the user to select a payment method. In the illustrated screen, the selected payment method is a credit card (shown generically here).

Figure 23:
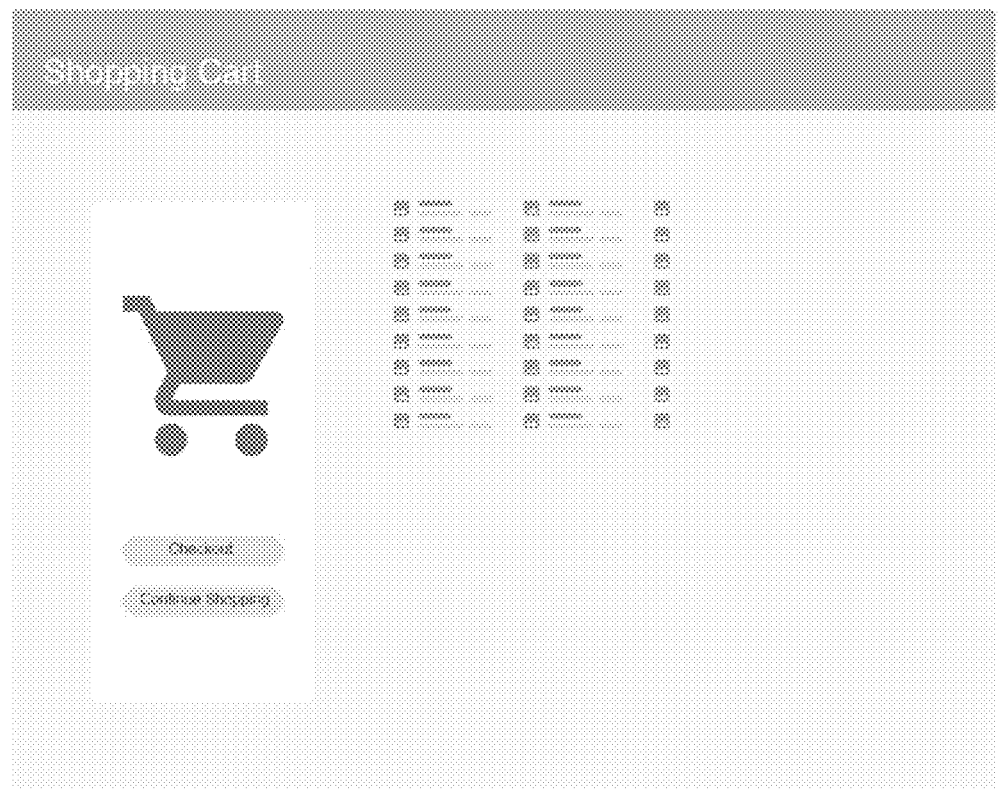

FIG. 23 shows an example screen shot 2300 that that can appear on the device of the user making the internet purchase and displays the items to be purchased.

Figure 24:
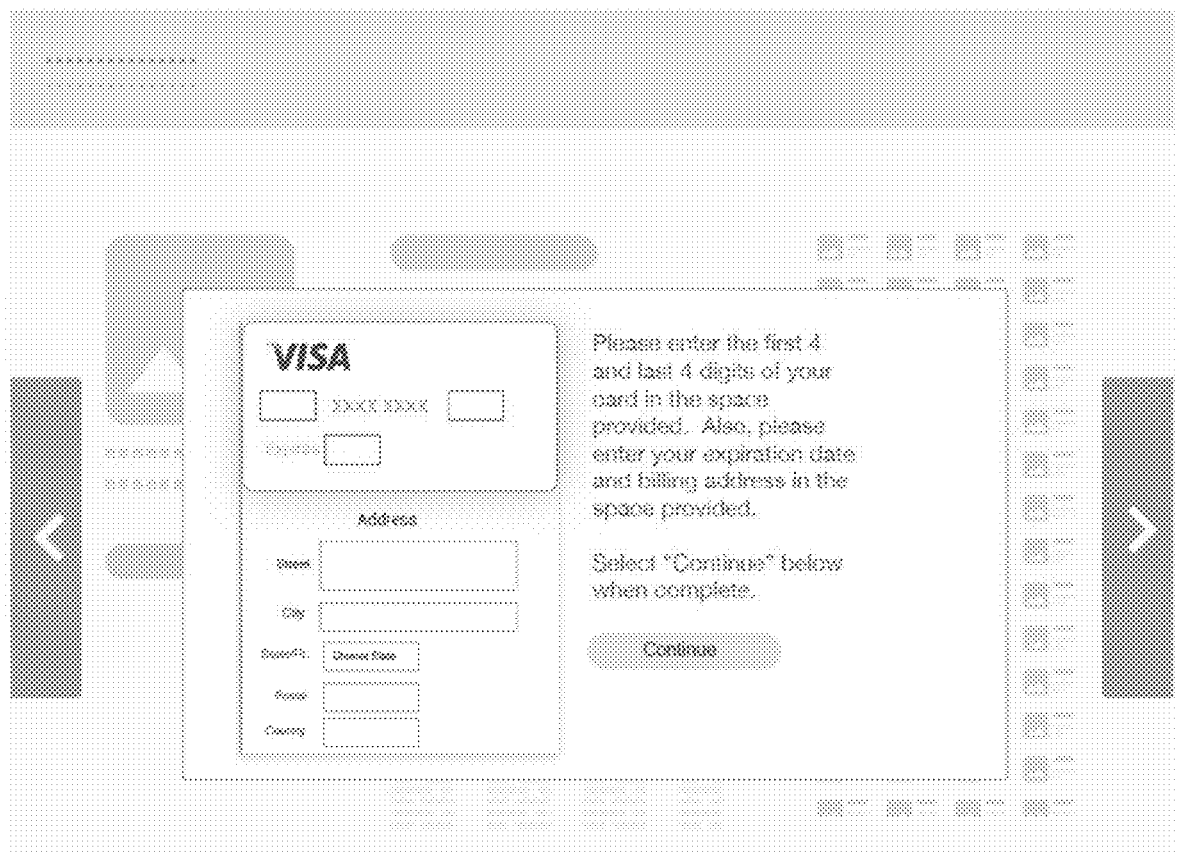

FIG. 24 shows an example screen shot 2400 that that can appear on the device of the user making the internet purchase and displays only a portion of the user's credit number in accordance with the embodiments described above. In particular, as seen in FIG. 24, one or more numbers (here, the middle 8 number, but that number can vary) of the user's credit number are not requested in the illustrated payment method.

Figure 25:
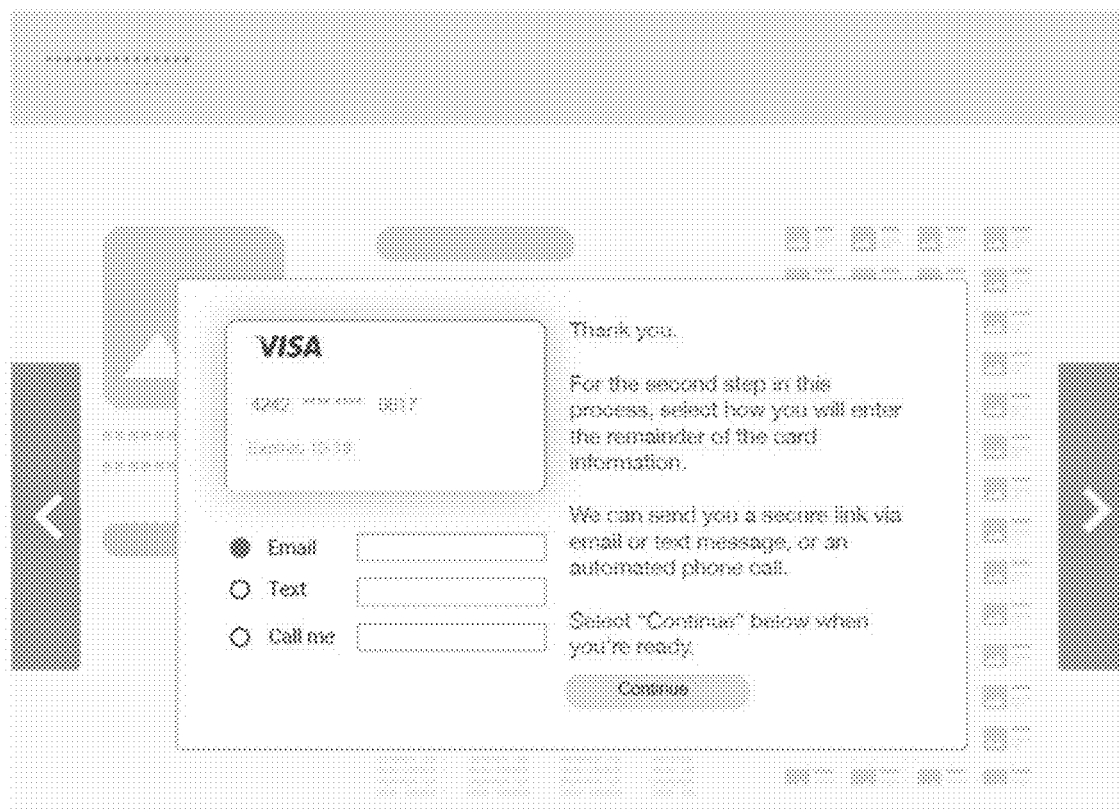

FIG. 25 shows an example screen shot 2500 that can appear on the device of the user making the internet purchase and that displays a selection screen through which the user can select one of multiple available mechanisms to complete the purchase (e.g., through which the user can supply the missing credit card numbers). In the illustrated example, three examples are presented: email, text, or a phone call. Any one or more of these can be present in embodiments of the disclosed technology. Further, one or more additional mechanisms can also be presented.

Figure 26:
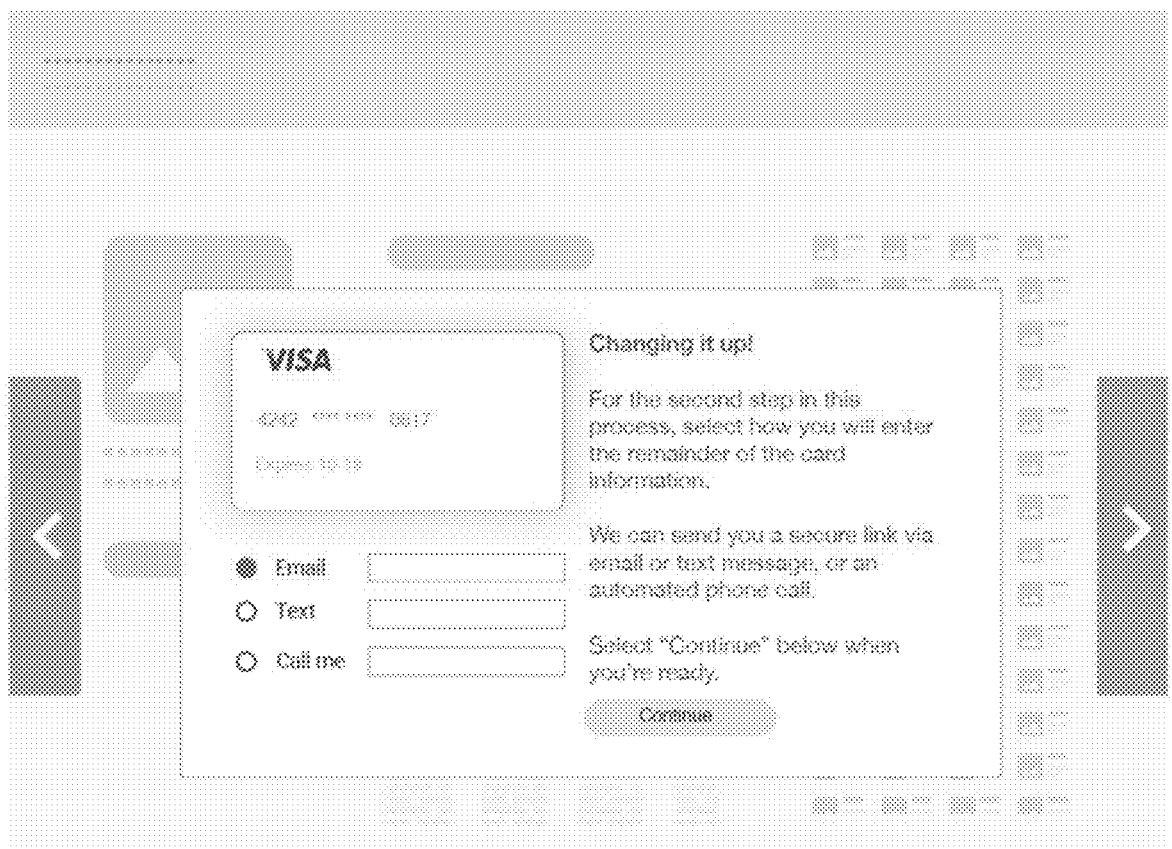

FIG. 26 shows an example screen shot 2600 of an alternative to FIG. 25 showing similar variants.

Figure 27:
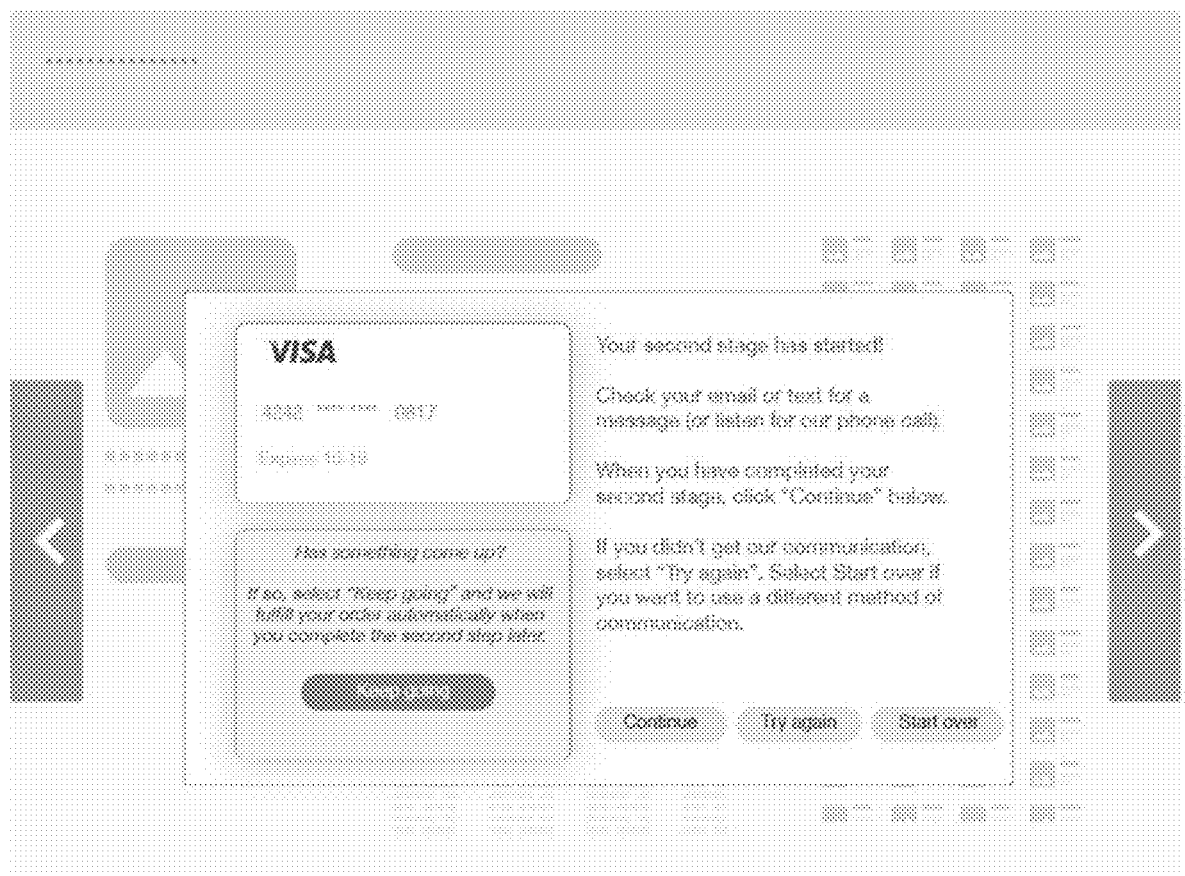

FIG. 27 shows an example screen shot 2700 of a screen indicating that the "second stage" of the purchase has started and that one of the options from an earlier screen (e.g., FIG. 25) has been selected. The screen shot also shows some options for the user to select, including "continue" (once the second stage is complete via the selected mechanism); "try again" (to re-start the selected second-stage process); and/or "start over" (to return to an earlier payment screen, where the user can alter one or more of the earlier payment entries). The screen shot 2700 also includes a message that can be selected to automatically complete the purchase whenever the selected second stage has been received (e.g., shown in FIG. 27 as the "keep going" option).

Figure 28:
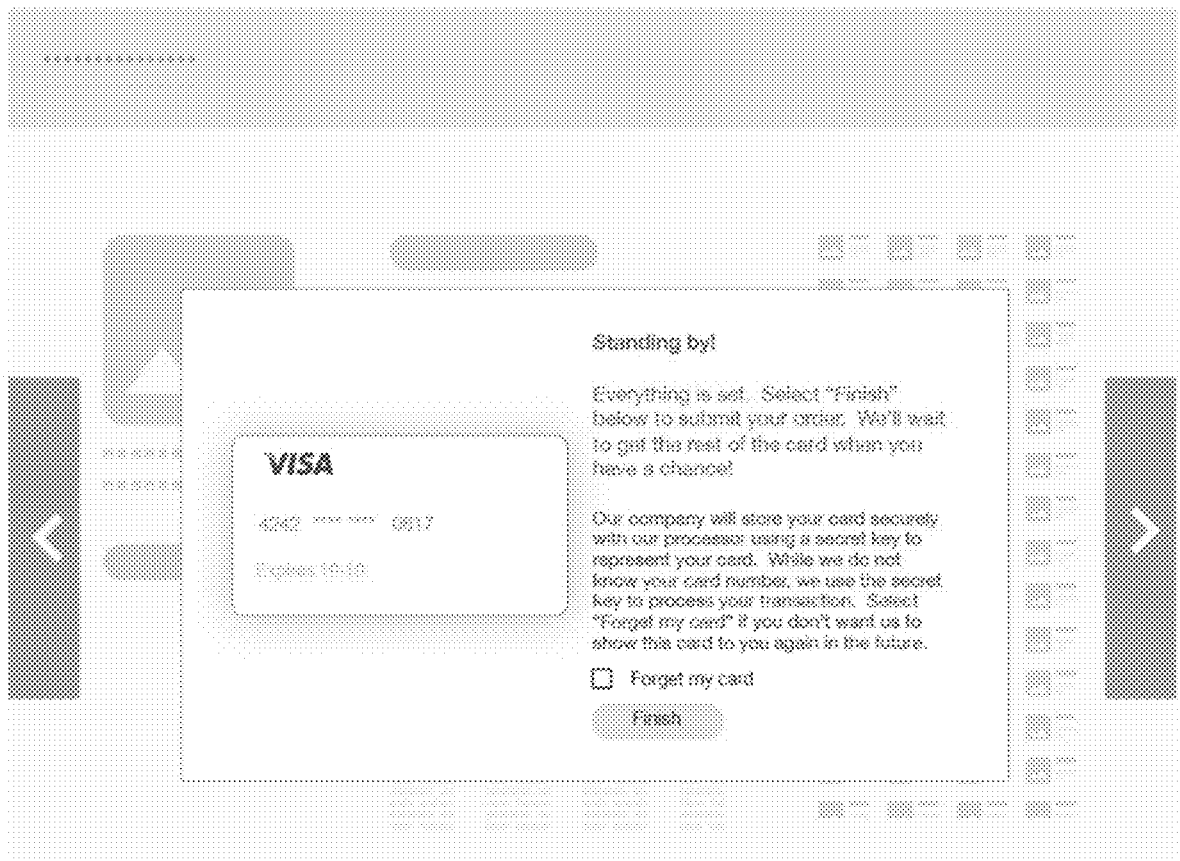

FIG. 28 shows another alternative example screen shot 2800 whereby the second stage of the payment process is incomplete, but the user can select (e.g., using the "finish" button) to provide the second-stage information at a later time.

Figure 29:
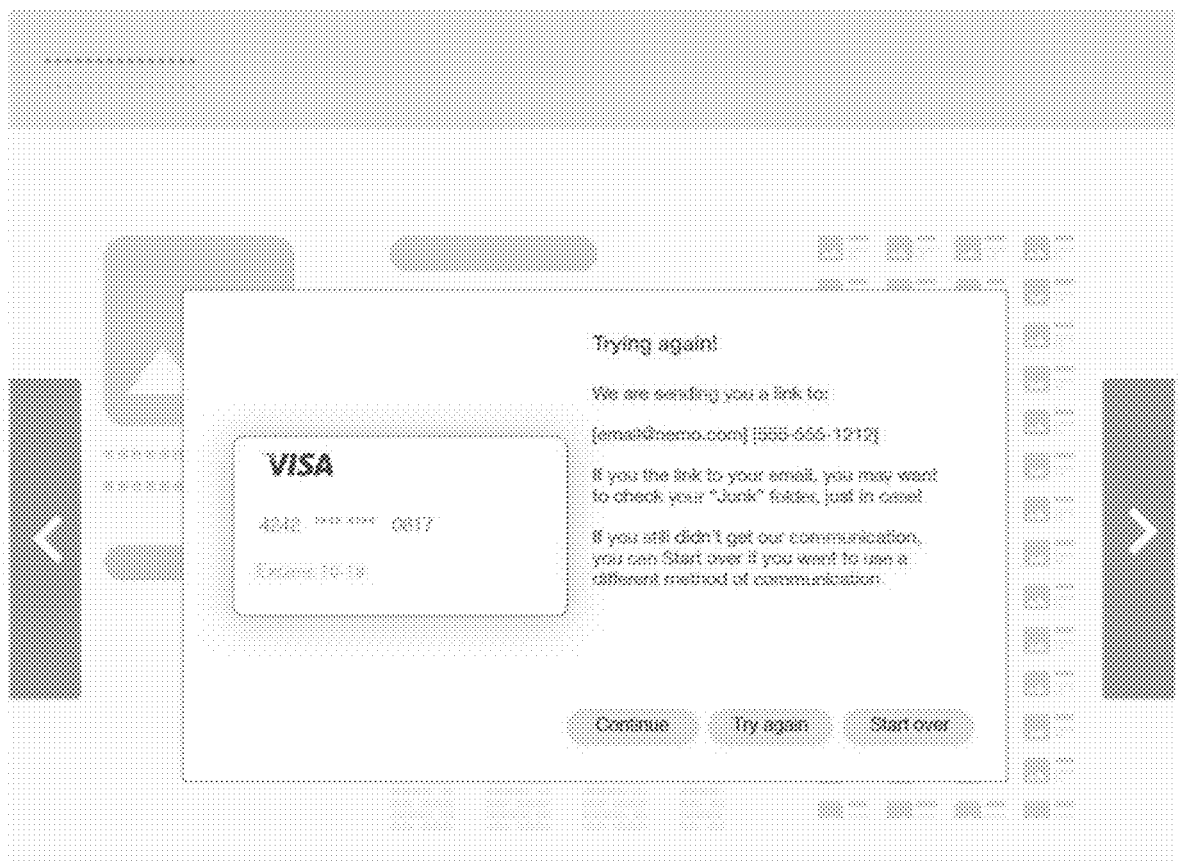

FIG. 29 shows an example screen shot 2900 of a message that can be sent to a user upon selecting to receive an email with the second-stage portal but where a first sent email was not received.

Figure 30:
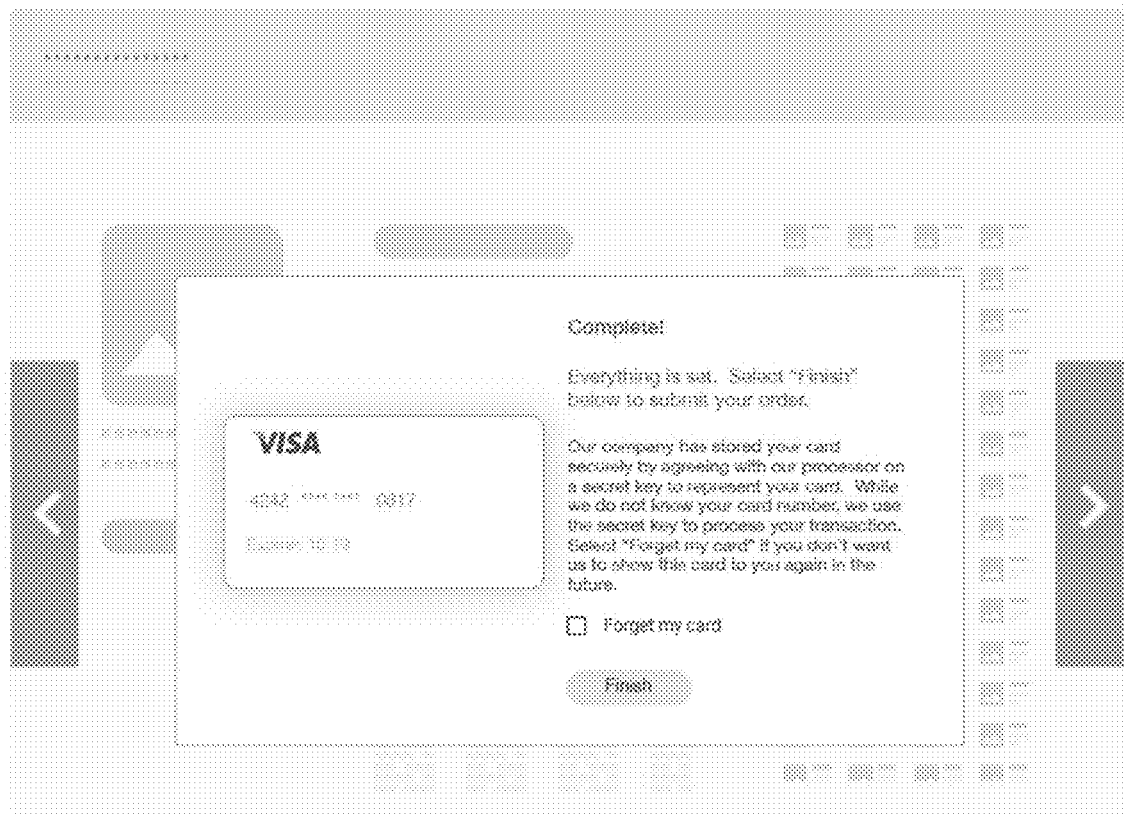

FIG. 30 shows an example screen shot 3000 of a message that can be sent to a user to indicate that the purchase is complete.

Figure 31:
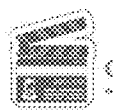
Figure 31:
Figure 31:
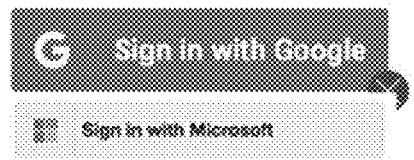

FIG. 31 shows an example screen shot 3100 of a login screen when the user may, at a later time, navigate to a website to complete the earlier initiated purchase. For instance, in the illustrated example, the user has selected to complete the second-stage of the purchase by receiving an email that includes a link to a particular website (here, stagedpay.com) to complete the purchase. Of course, this particular site is by way of example only. Further, at the illustrated website, the user is further asked to sign in via a number of well recognized online resources that commonly store user information. It should be understood, however, that the technology encompasses other vendors or no sign at all.

Figure 32:
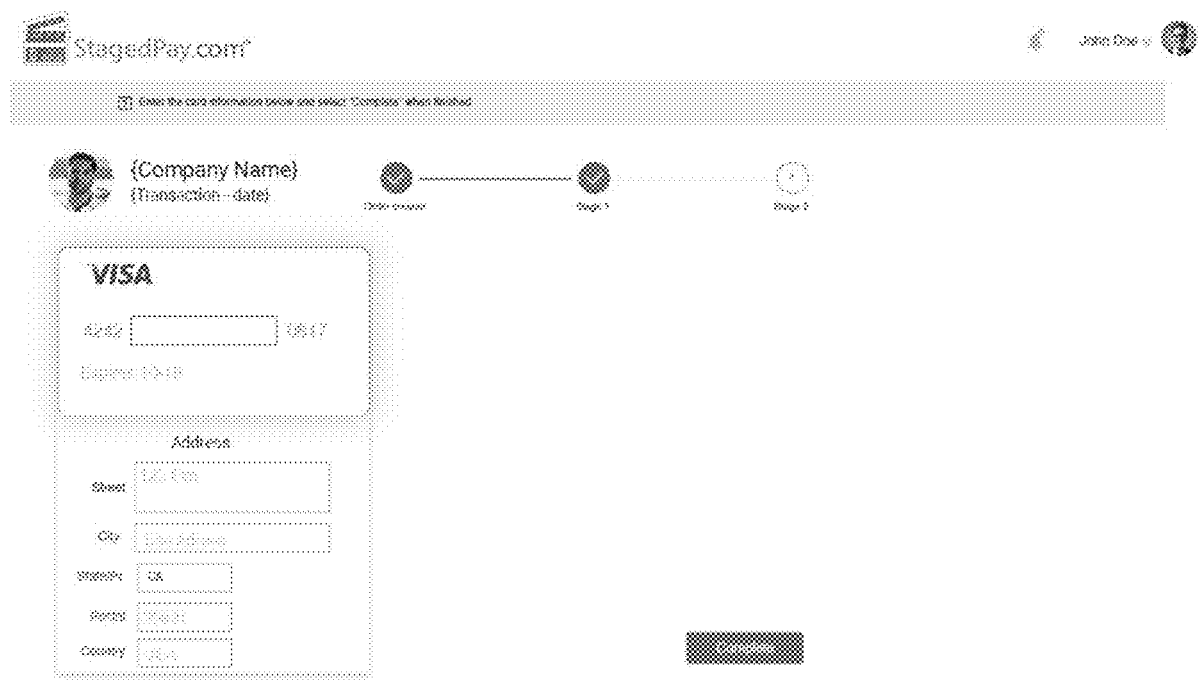

FIG. 32 shows an example screen shot 3200 (e.g., following 3100) whereby the user may fill out the missing information from the earlier initiated transaction. In particular, the example screen shot shows a representation of the user's credit card with the missing information highlighted in a user-interface input box for completion by the user.

Figure 33:
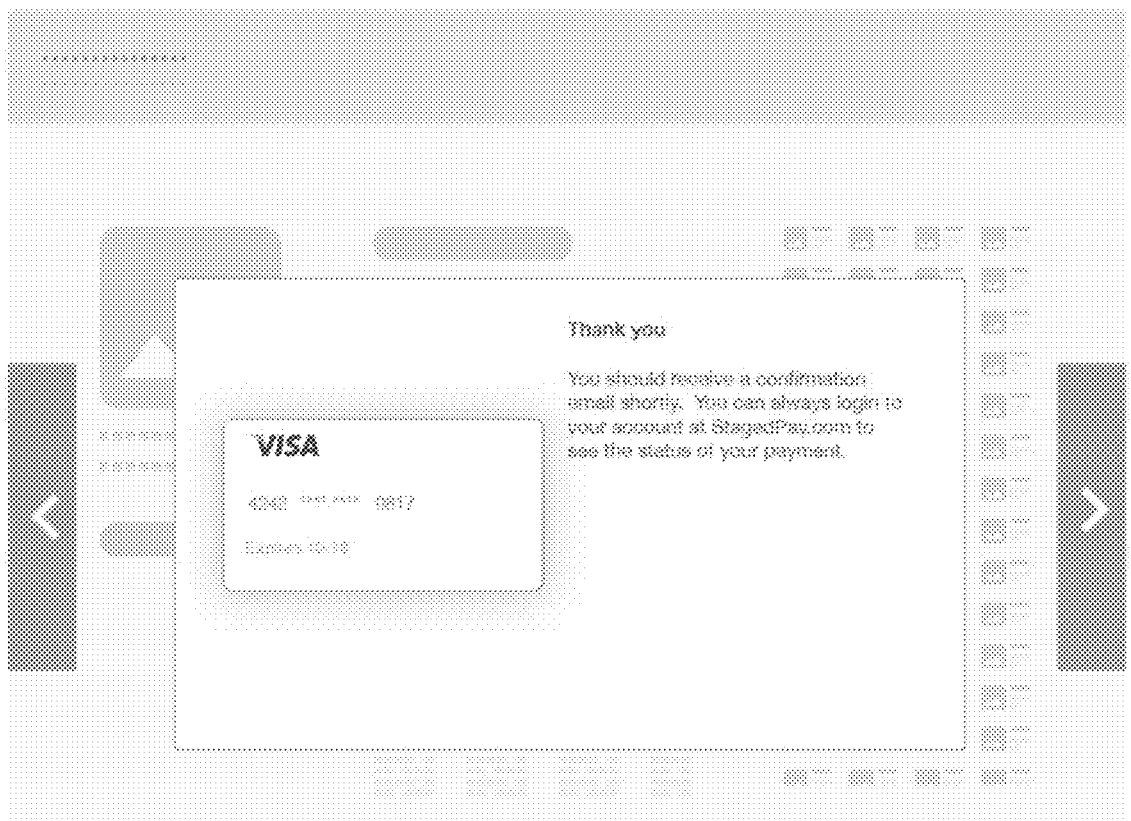

FIG. 33 shows an example screen shot 3300 (e.g., following 3200) of a message that can be sent to a user to indicate that the purchase is complete.

Figure 34:
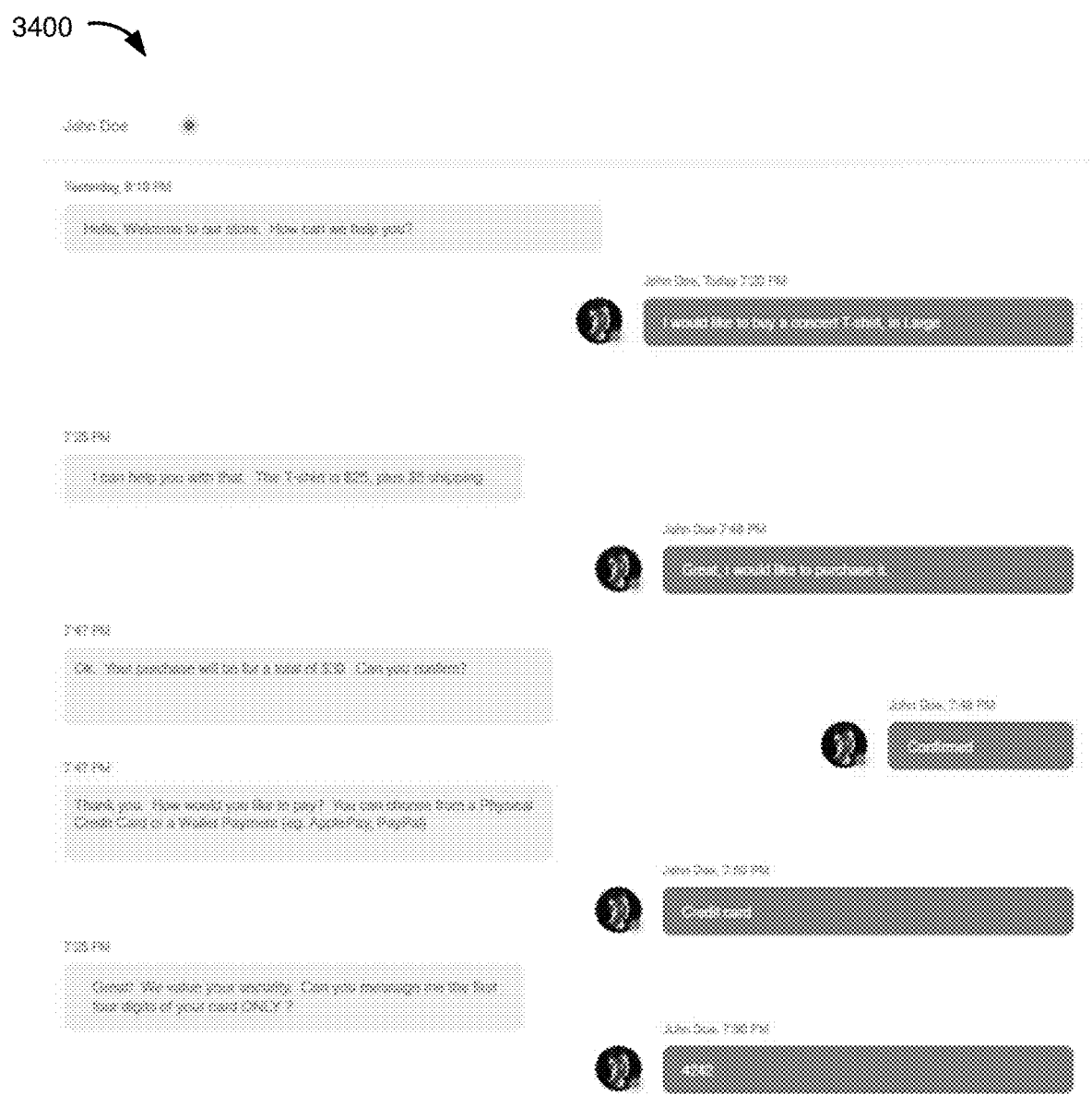
Figure 35:
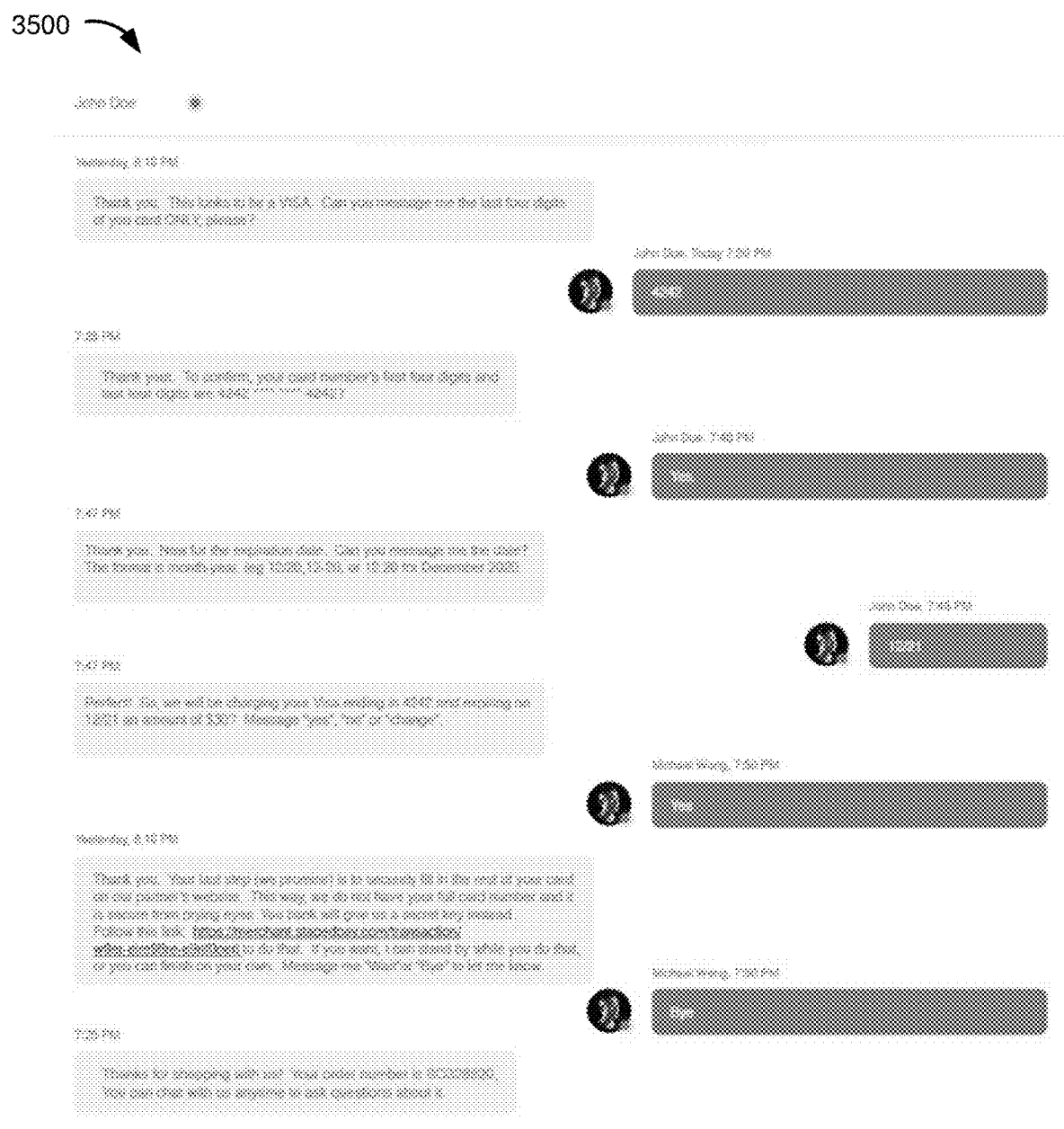

FIGS. 34-35 are example screen shots 3400 and 3500 of a first and second text exchange that can occur when a user selects to perform the second-stage of the transaction via text.

V. Concluding Remarks

In view of the many possible embodiments to which the principles of the disclosed invention may be applied, it should be recognized that the illustrated embodiments are only preferred examples of the invention and should not be taken as limiting the scope of the invention.

What is claimed is:

1. A computer-implemented method, comprising:
    at a server separate from a merchant server and separate from a payment processor server:
        receiving data indicative of a transaction initiated by a customer from the merchant server;
        generating a unique identification value for the transaction;
        transmitting, to a customer's computing device, identifying information for a Uniform Resource Locator (URL) that is unique to the transaction;
        receiving a request to view a web page at the URL that is unique to the transaction; and
        generating data for a hosted-pay web page unique to the transaction, the hosted-pay web page including an embedded portion that facilitates payment directly with a payment processor server and not with a merchant server.

2. The computer-implemented method of claim 1, wherein the hosted-pay web page further includes one or more visual look-and-feel elements corresponding to the merchant server, thereby creating a hosted-pay web page that appears to be provided by the merchant server but is instead provided by the server that is separate from the merchant server and separate from the payment processor server.

3. The computer-implemented method of claim 1, wherein the data indicative of the transaction comprises an originating ID that identifies an identity of the merchant operating the merchant server, and wherein the method further comprises, upon receiving the request to view the web page at the URL that is unique to the transaction:
    identifying the originating ID associated with the transaction; and
    retrieving data for performing the hosted pay web page for the merchant operating the merchant server, including data identifying a payment processor used by the merchant.

4. The computer-implemented method of claim 1, wherein the method further comprises:
    generating a transaction ID value for the transaction;
    generating a reference ID values for the transaction; and
    embedding the reference ID value for the transaction into the URL that is unique to the transaction.

5. The computer-implemented method of claim 1, further comprising:
    receiving a digital token from the payment processor server, the digital token being unique to the transaction; and
    transmitting to the merchant server data indicating that the transaction is authorized and ready to be completed.

6. The computer-implemented method of claim 5, further comprising transmitting the digital token to the merchant server.

7. A computer-implemented method, comprising:
    at a server separate from a merchant server and separate from a payment processor server:
    receiving, from the merchant server and for a transaction with a merchant operating the merchant server, a first portion of a customer's credit card number, the first portion including one or more numbers of the customer's credit card number but not all of the numbers of the customer's credit card number;
    transmitting data to a computing device operated by the customer for rendering a web page that requests a second portion of the customer's credit card number, the second portion corresponding to the remaining one or more numbers of the customer's credit card number not specified by the first portion;
    receiving, from the computing device operated by the customer, the second portion of the customer's credit card number;
    transmitting, to a payment processor server, a complete version of the customer's credit card number assembled from at least the first portion and the second portion;

receiving, from the payment processor server, a digital token from the payment processor server, the digital token being unique to the transaction; and transmitting to the merchant server data indicating that the transaction is authorized and ready to be completed.

8. The computer-implemented method of claim 7, wherein the first portion of the customer's credit card number is input by a representative, and wherein the representative is never exposed to the complete customer's credit card number.

9. A computer-implemented method, comprising:
at a server separate from a merchant system/server and separate from a payment processor server:
receiving data indicative of a transaction to be closed for a customer from the merchant server;
generating a unique identification value for the transaction;
transmitting, to the merchant system/server, identifying information for a Uniform Resource Locator (URL) that is unique to the transaction;
receiving a request to view a web page at the URL that is unique to the transaction; and
generating data for a hosted-pay web page unique to the transaction, the hosted-pay web page including an embedded portion that facilitates payment directly with a payment processor server and not with the merchant system/server.

10. The computer-implemented method of claim 9, wherein the identifying information is encoded in a printable or displayable code that can be optically scanned to decode the identifying information, including the URL that is unique to the transaction.

11. The computer-implemented method of claim 10, further comprising, by the merchant system/server, displaying the code on a merchant-operated display device.

12. The computer-implemented method of claim 10, wherein the code is scanned by a computing device operated by a customer, thereby generating a link to the URL that is unique to the transaction.

13. The computer-implemented method of claim 9, wherein the URL is transmitted to the merchant system/server, and wherein the merchant system/server encodes the identifying information, including that URL that is unique to the transaction, in a printable or displayable code.

14. The computer-implemented method of claim 13, wherein the code is scanned by a computing device operated by a customer, thereby generating a link to the URL that is unique to the transaction.

15. The computer-implemented method of claim 9, wherein the hosted-pay web page further includes one or more visual look-and-feel elements corresponding to the merchant server, thereby creating a hosted-pay web page that appears to be provided by the merchant server but is instead provided by the server that is separate from the merchant server and separate from the payment processor server.

16. The computer-implemented method of claim 9, wherein the data indicative of the transaction comprises an originating ID that identifies an identity of the merchant operating the merchant server, and wherein the method further comprises, upon receiving the request to view the web page at the URL that is unique to the transaction:
identifying the originating ID associated with the transaction; and
retrieving data for performing the hosted pay web page for the merchant operating the merchant server, including data identifying a payment processor used by the merchant.

17. The computer-implemented method of claim 9, wherein the method further comprises:
generating a transaction ID value for the transaction;
generating a reference ID values for the transaction; and
embedding the reference ID value for the transaction into the URL that is unique to the transaction.

18. The computer-implemented method of claim 9, further comprising:
receiving a digital token from the payment processor server, the digital token being unique to the transaction; and
transmitting to the merchant server data indicating that the transaction is authorized and ready to be completed.

19. The computer-implemented method of claim 9, further comprising transmitting the digital token to the merchant server.

* * * * *